April 19, 1927.

E. CONTI 1,625,350

MACHINE FOR FORMING, PRINTING, AND ASSEMBLING ENVELOPES

Filed Sept. 30, 1921     18 Sheets-Sheet 1

INVENTOR
Eugene Conti,
BY
Emery, Varney, Blair & Hoguet
ATTORNEYS

April 19, 1927. 1,625,350
E. CONTI
MACHINE FOR FORMING, PRINTING, AND ASSEMBLING ENVELOPES
Filed Sept. 30, 1921 18 Sheets-Sheet 3
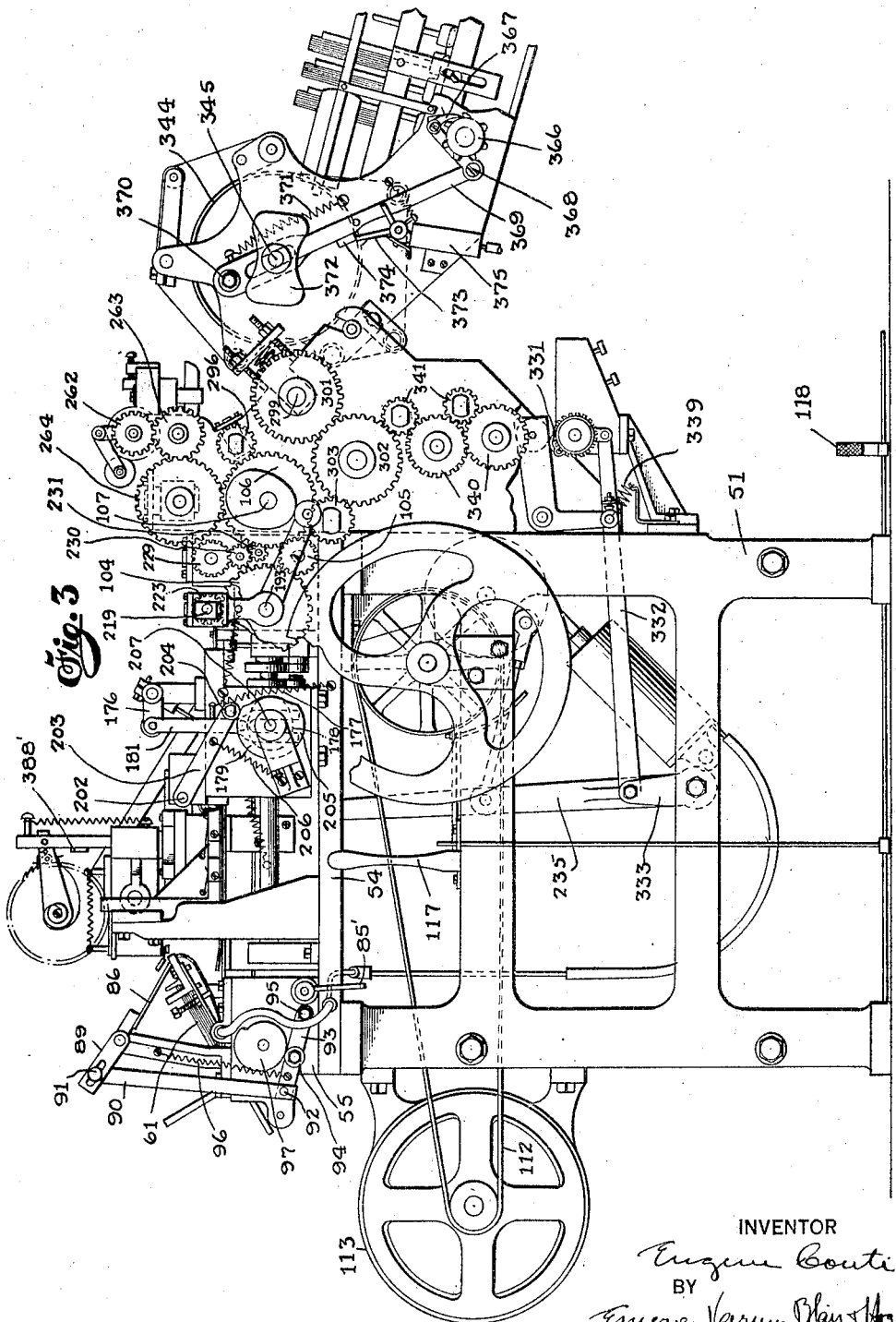
INVENTOR
Eugene Conti,
BY
Emery, Varney, Blair & Hoguet
ATTORNEYS April 19, 1927.
E. CONTI
1,625,350
MACHINE FOR FORMING, PRINTING, AND ASSEMBLING ENVELOPES
Filed Sept. 30, 1921     18 Sheets-Sheet 4
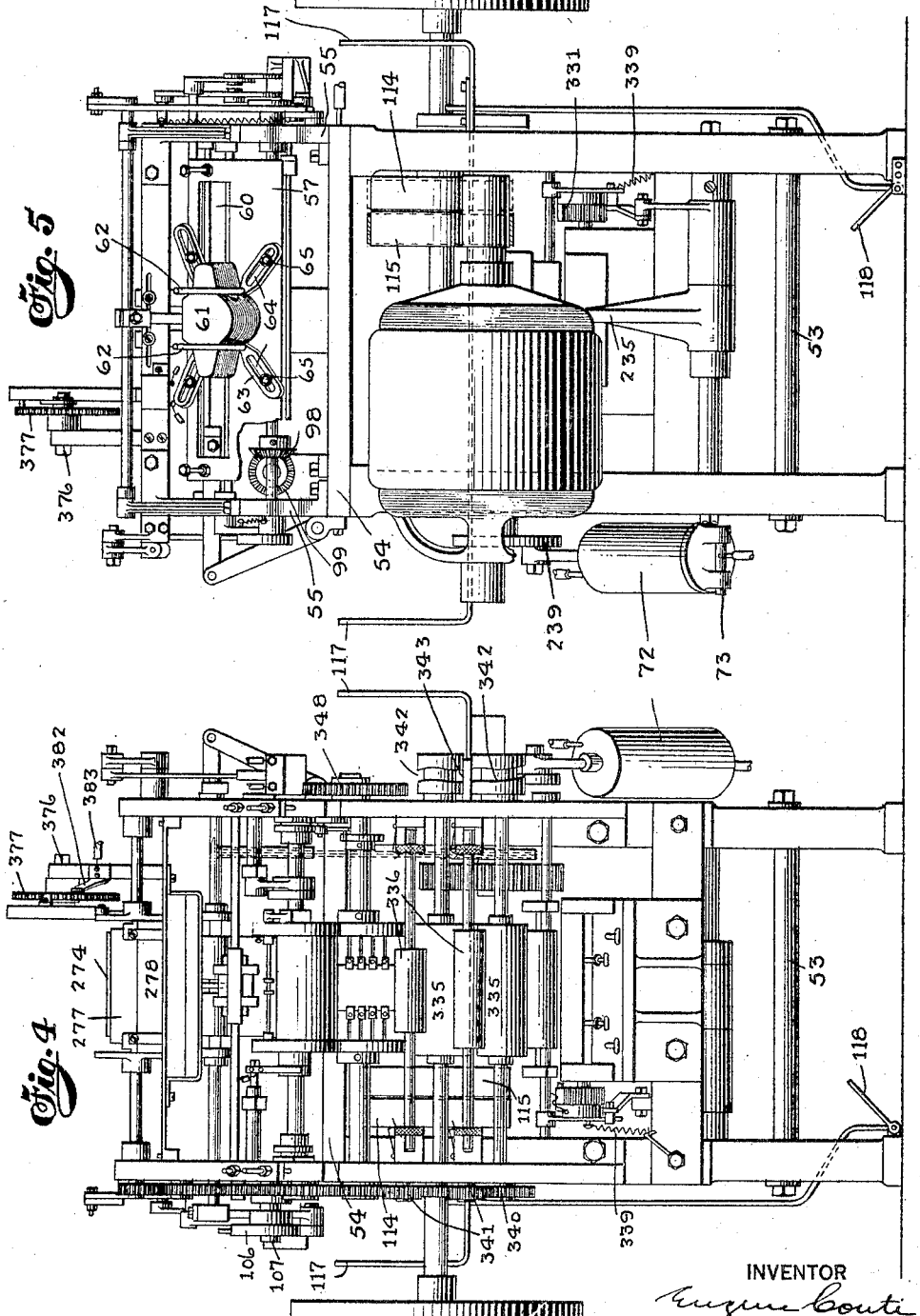

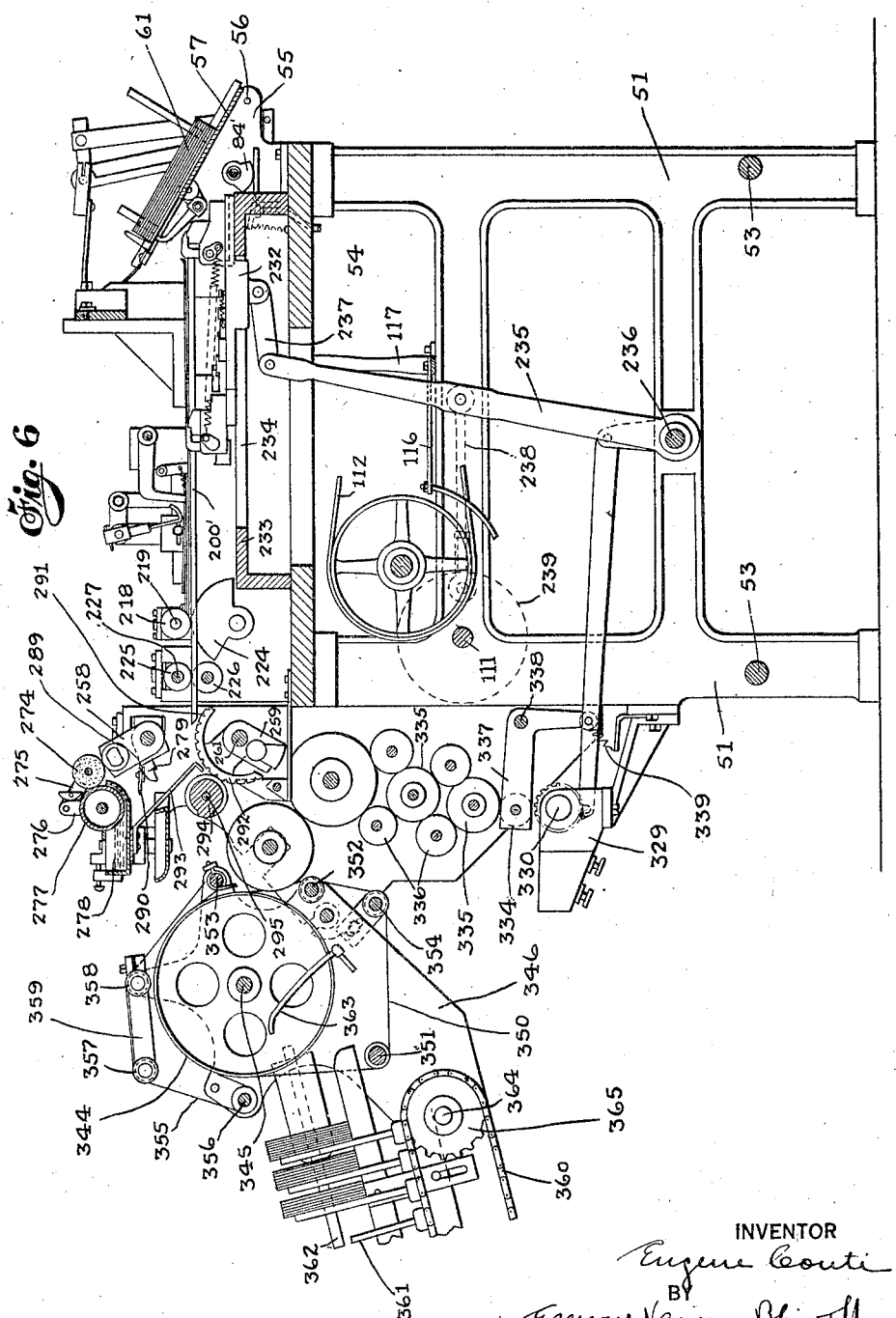

April 19, 1927.  
E. CONTI  
1,625,350  
MACHINE FOR FORMING, PRINTING, AND ASSEMBLING ENVELOPES  
Filed Sept. 30, 1921  18 Sheets-Sheet 6
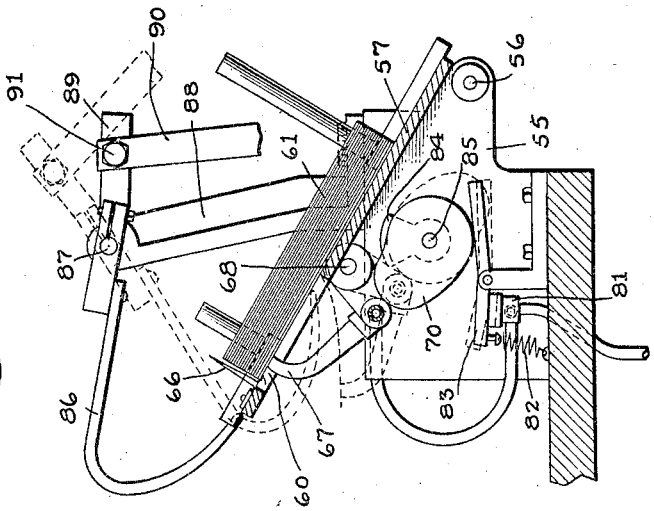
INVENTOR  
Eugene Conti  
BY  
Emery, Varney, Blair & Hogarth  
ATTORNEYS

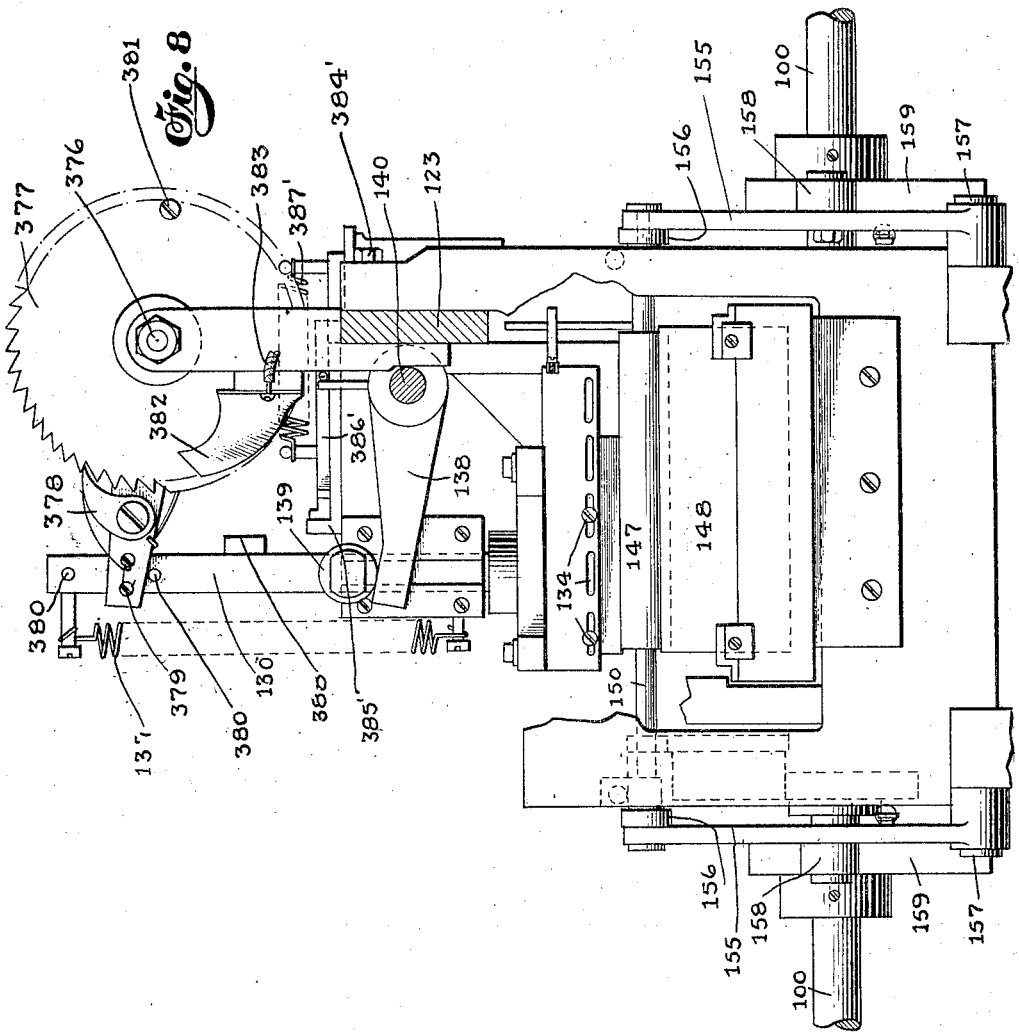

April 19, 1927.  E. CONTI  1,625,350
MACHINE FOR FORMING, PRINTING, AND ASSEMBLING ENVELOPES
Filed Sept. 30, 1921   18 Sheets-Sheet 8
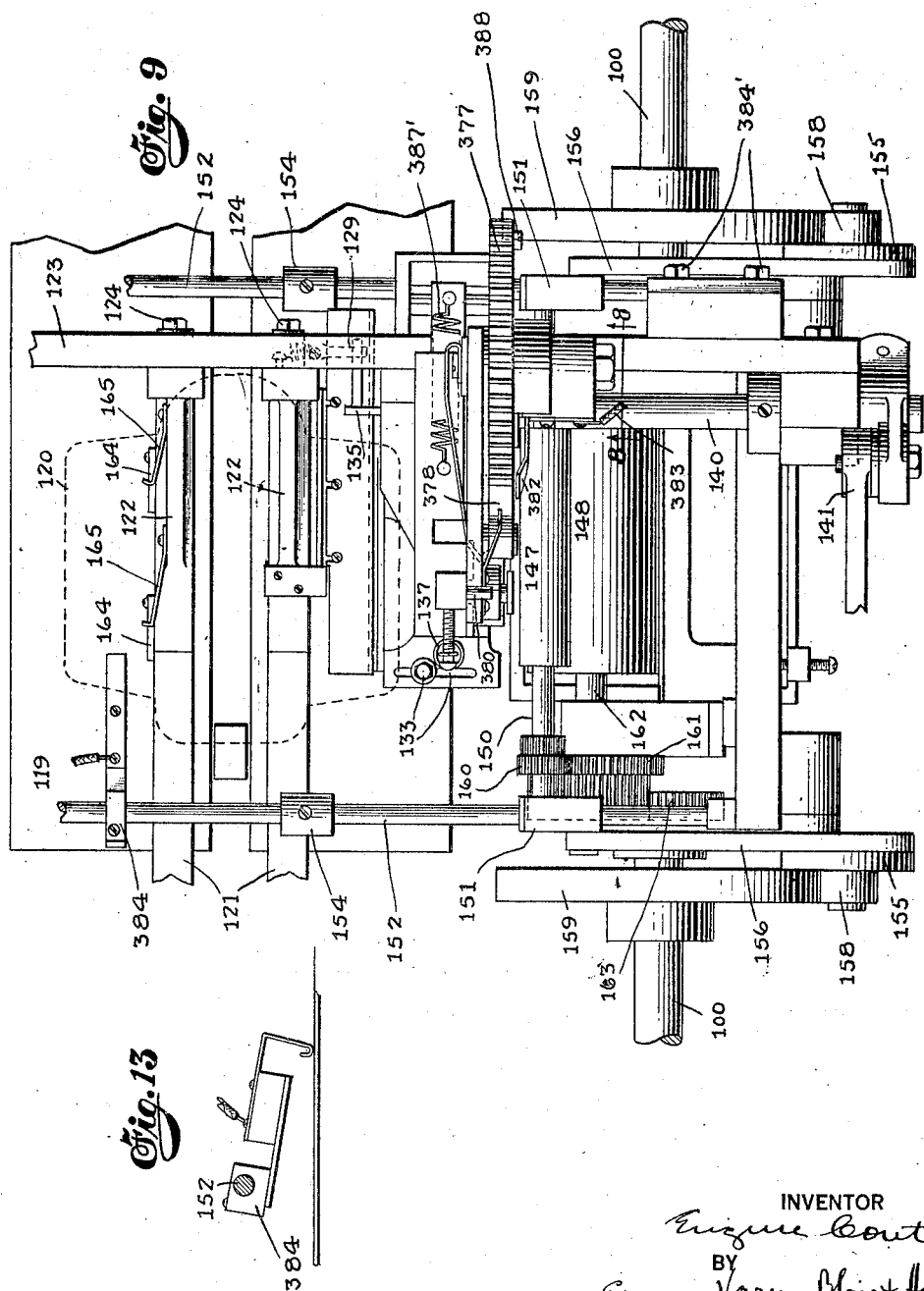

April 19, 1927.
E. CONTI
1,625,350
MACHINE FOR FORMING, PRINTING, AND ASSEMBLING ENVELOPES
Filed Sept. 30, 1921     18 Sheets-Sheet 9
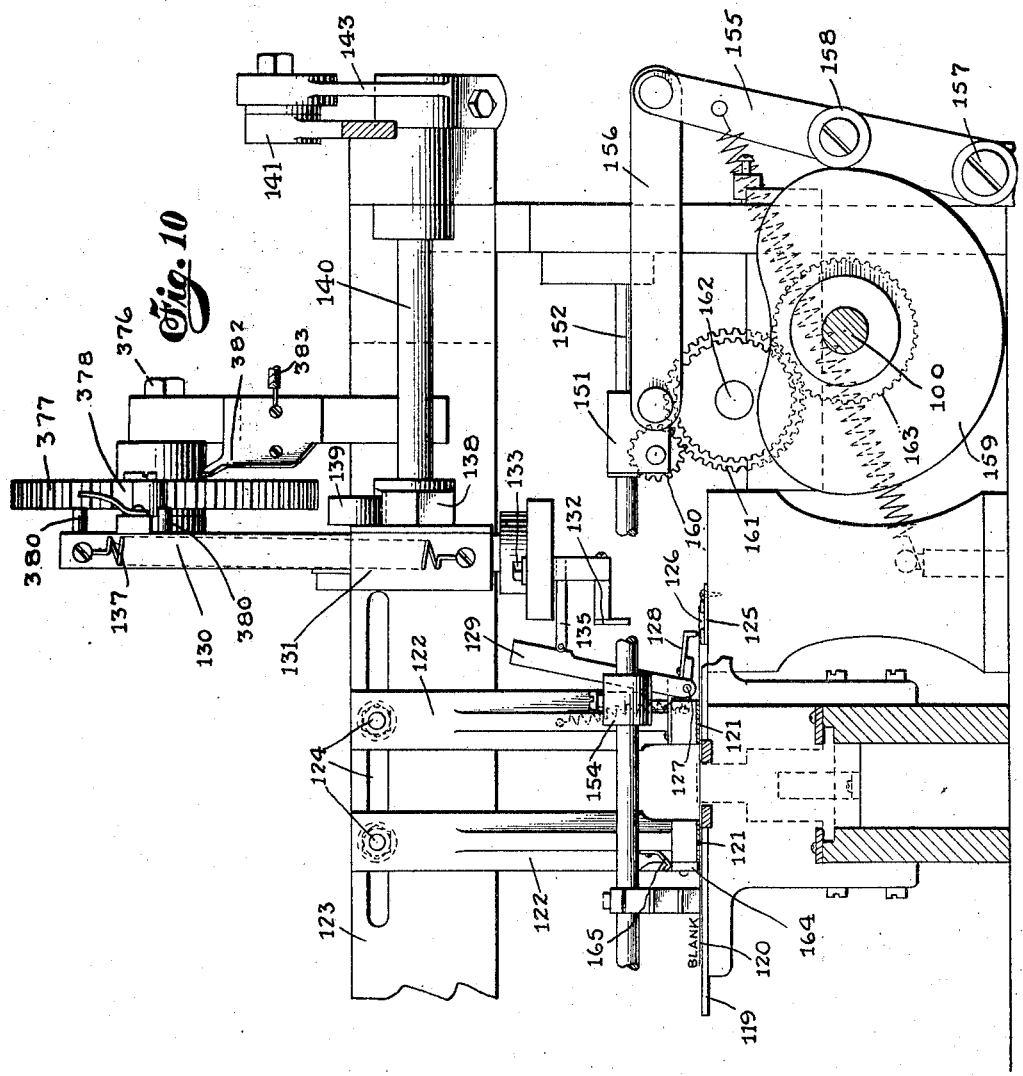

April 19, 1927. 1,625,350
E. CONTI
MACHINE FOR FORMING, PRINTING, AND ASSEMBLING ENVELOPES
Filed Sept. 30, 1921   18 Sheets-Sheet 10
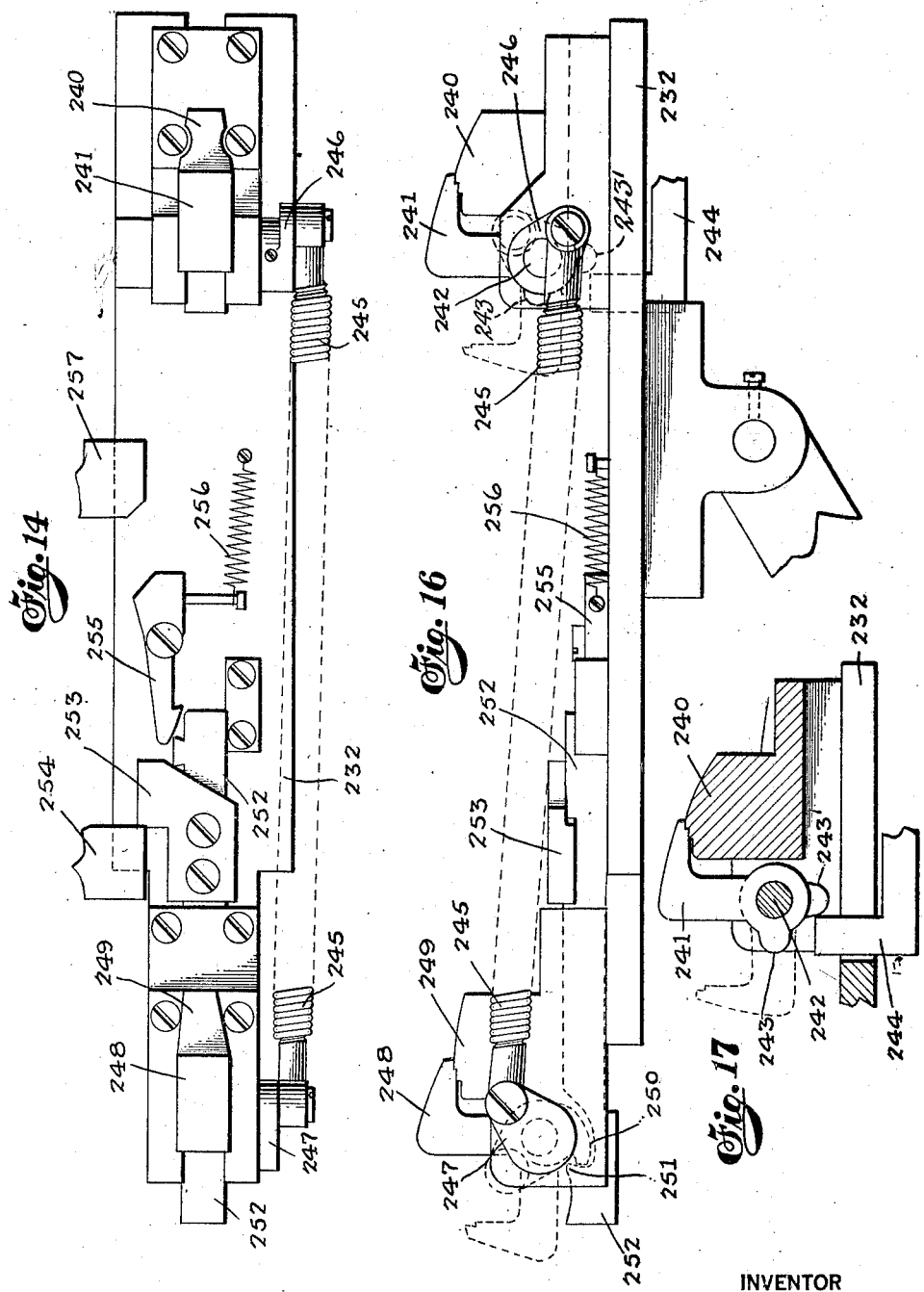
INVENTOR
Eugene Conti
BY
Emery, Varney, Blair & Hoquet
ATTORNEYS

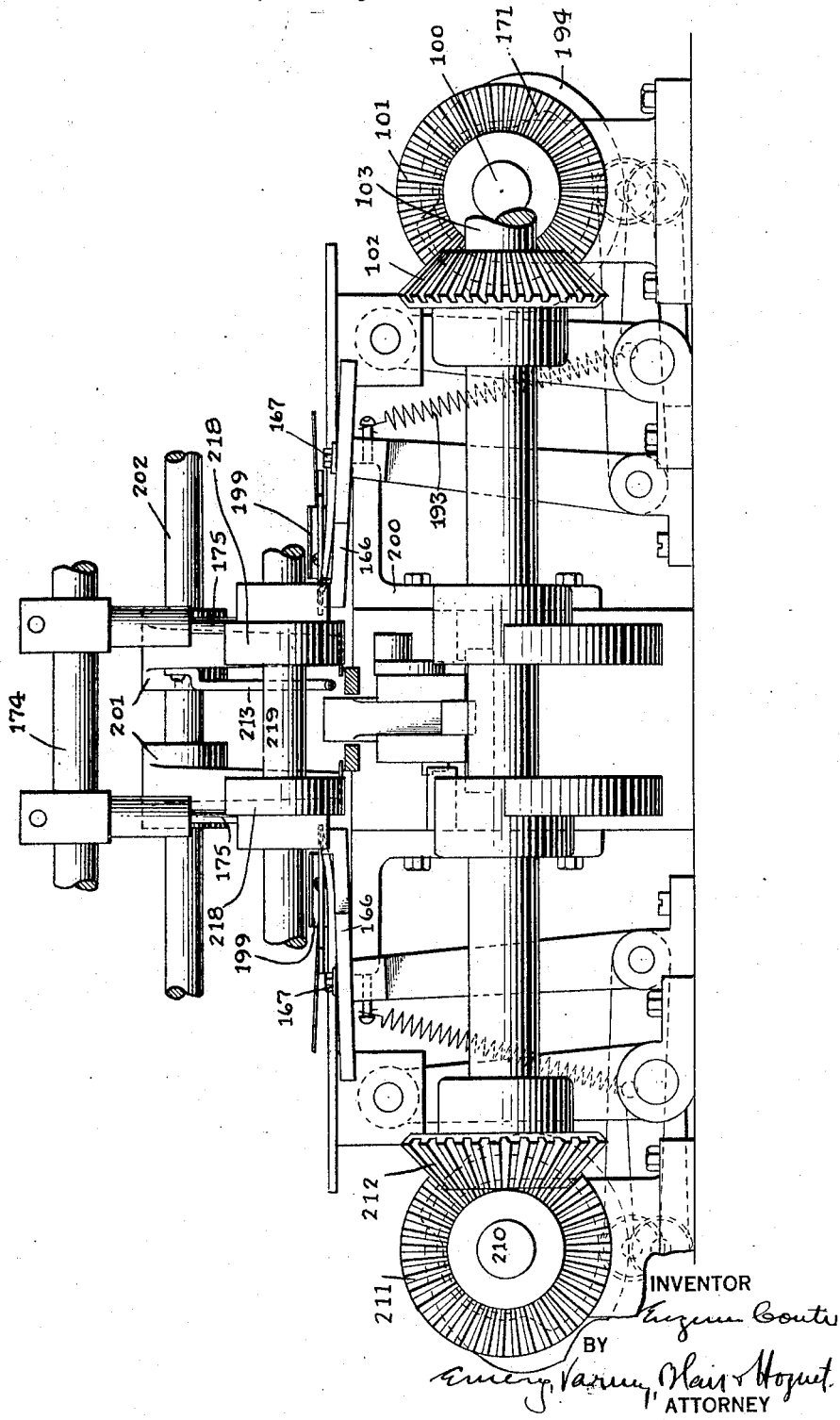

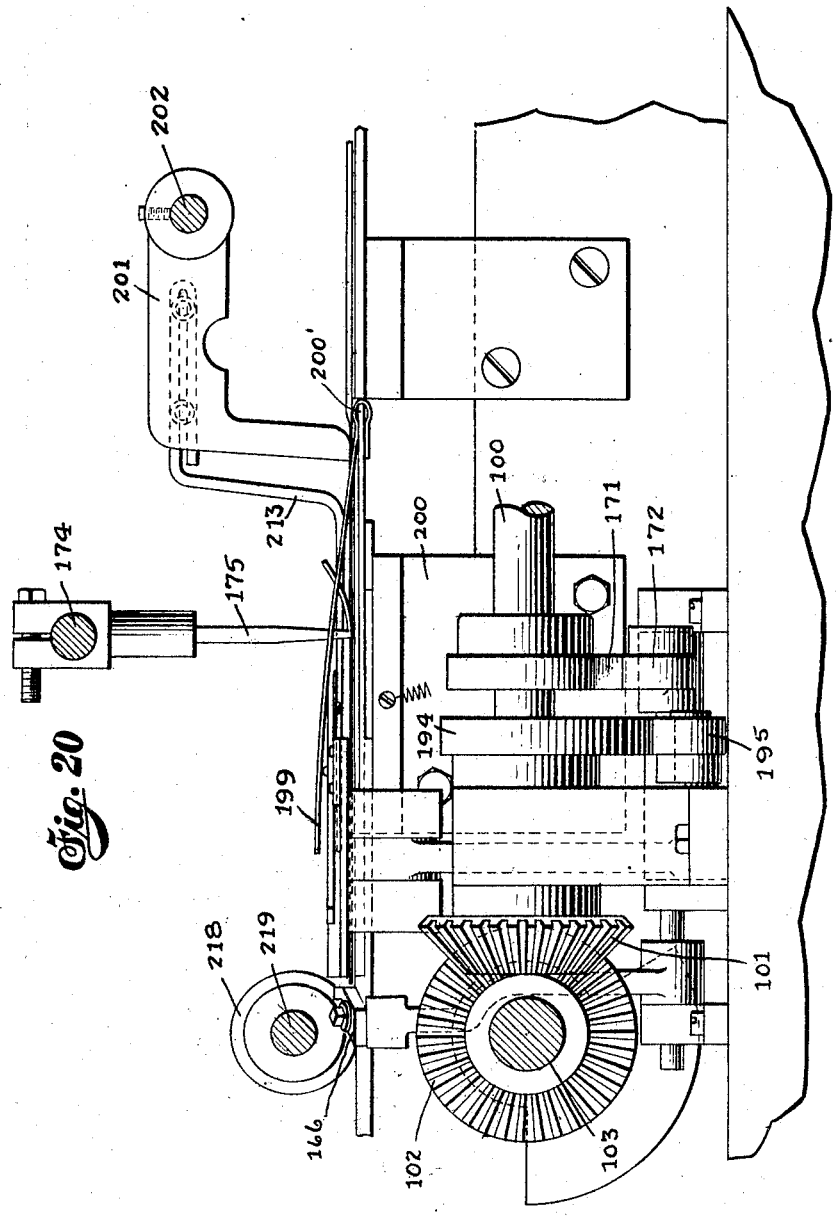

April 19, 1927.　　　　　　　　　　　　　　　　1,625,350
E. CONTI
MACHINE FOR FORMING, PRINTING, AND ASSEMBLING ENVELOPES
Filed Sept. 30, 1921　　　18 Sheets-Sheet 14
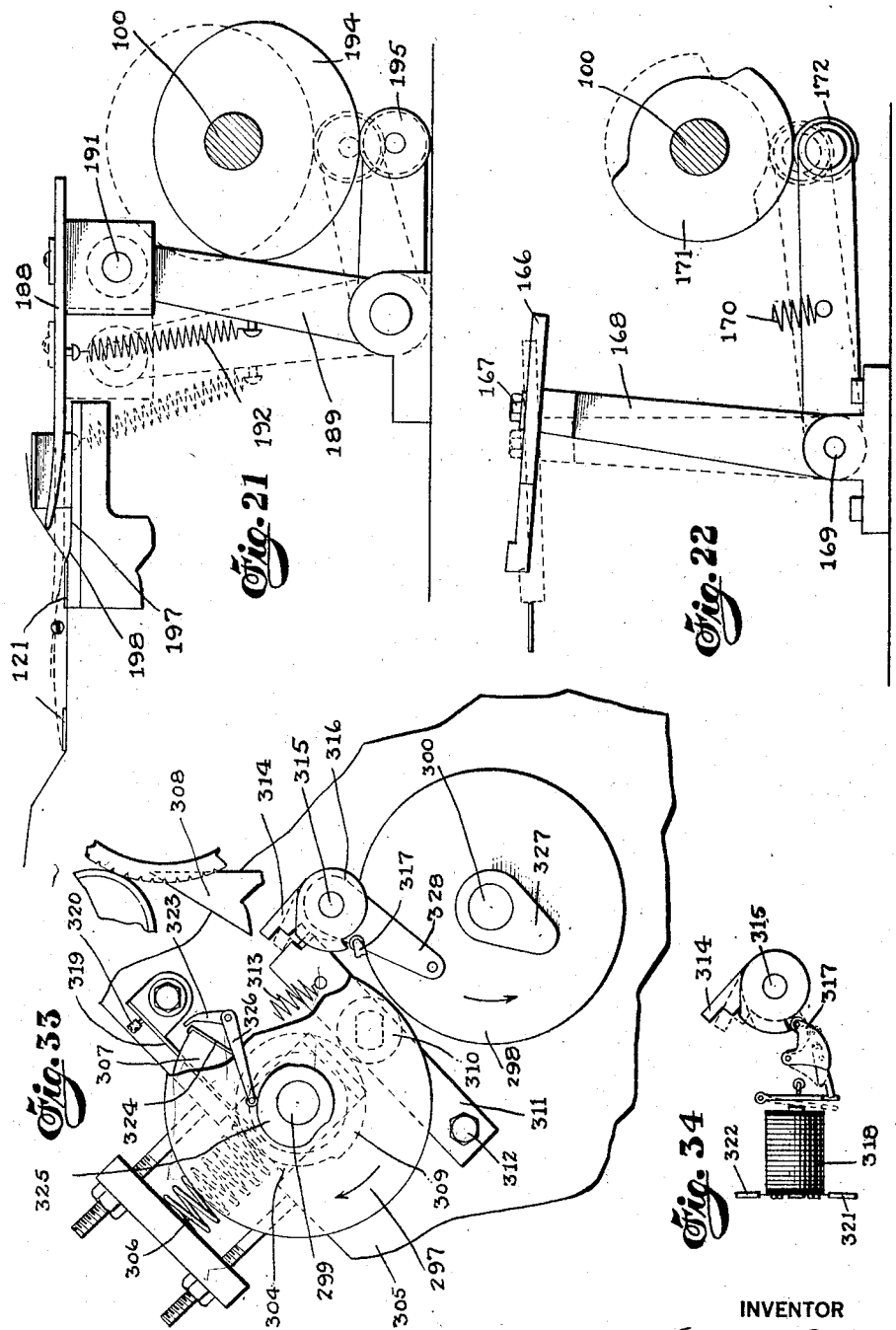
INVENTOR
Eugene Conti
BY
Emery, Varney, Blair & Hoguet
ATTORNEYS April 19, 1927. 1,625,350
E. CONTI
MACHINE FOR FORMING, PRINTING, AND ASSEMBLING ENVELOPES
Filed Sept. 30, 1921   18 Sheets-Sheet 15

INVENTOR
BY
ATTORNEYS

April 19, 1927. 1,625,350
E. CONTI
MACHINE FOR FORMING, PRINTING, AND ASSEMBLING ENVELOPES
Filed Sept. 30, 1921   18 Sheets-Sheet 16
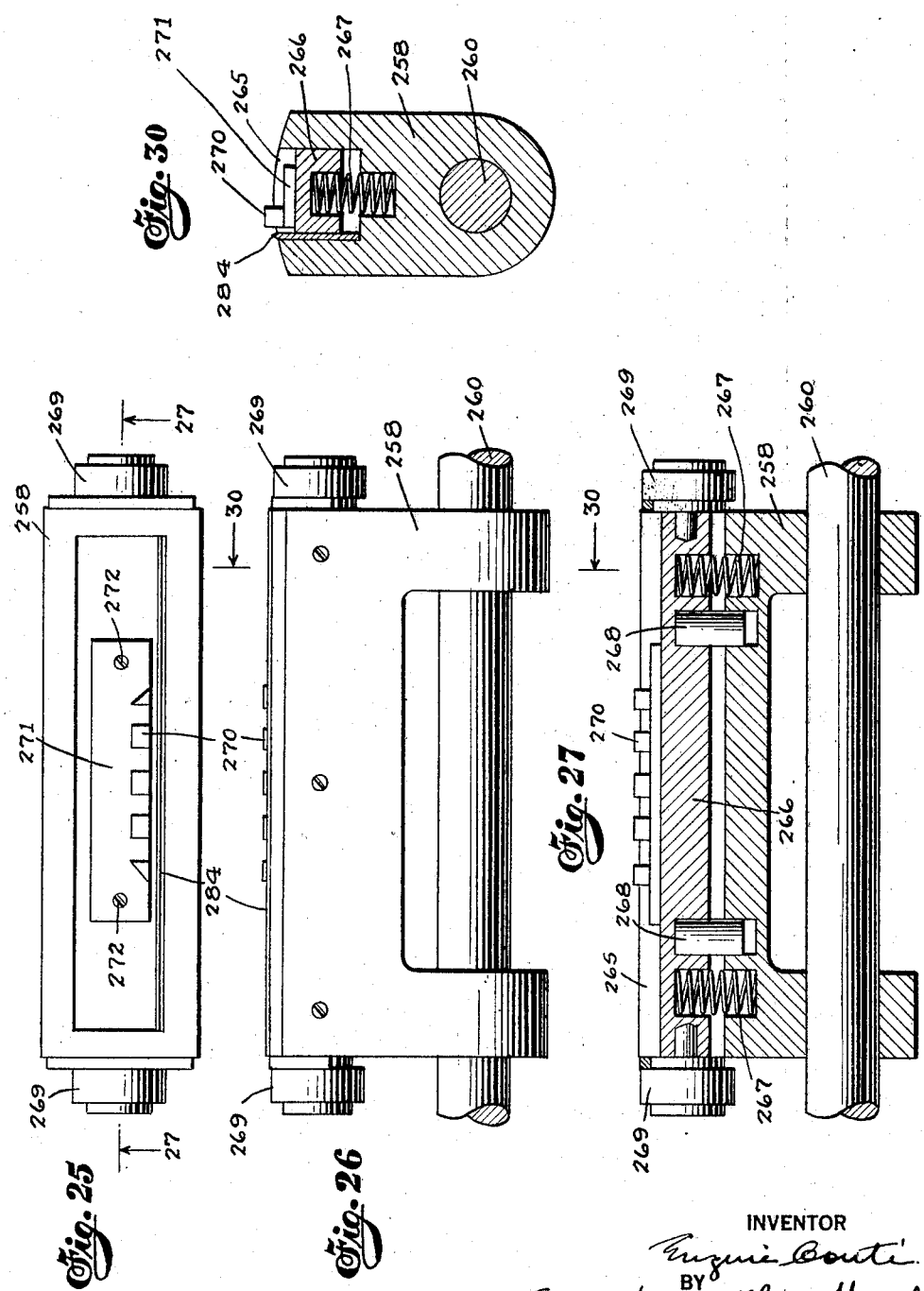
INVENTOR
BY
ATTORNEYS April 19, 1927.
E. CONTI
1,625,350
MACHINE FOR FORMING, PRINTING, AND ASSEMBLING ENVELOPES
Filed Sept. 30, 1921     18 Sheets-Sheet 17
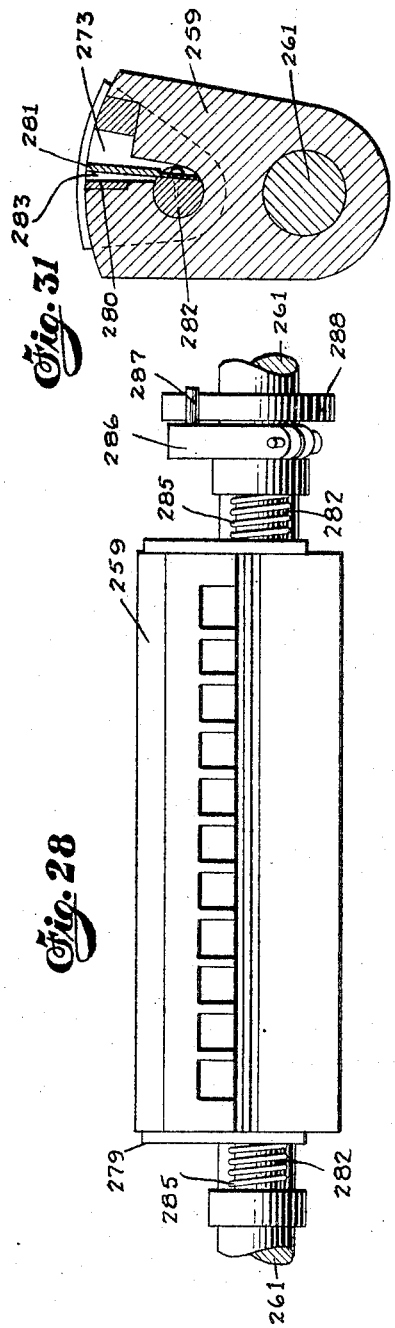
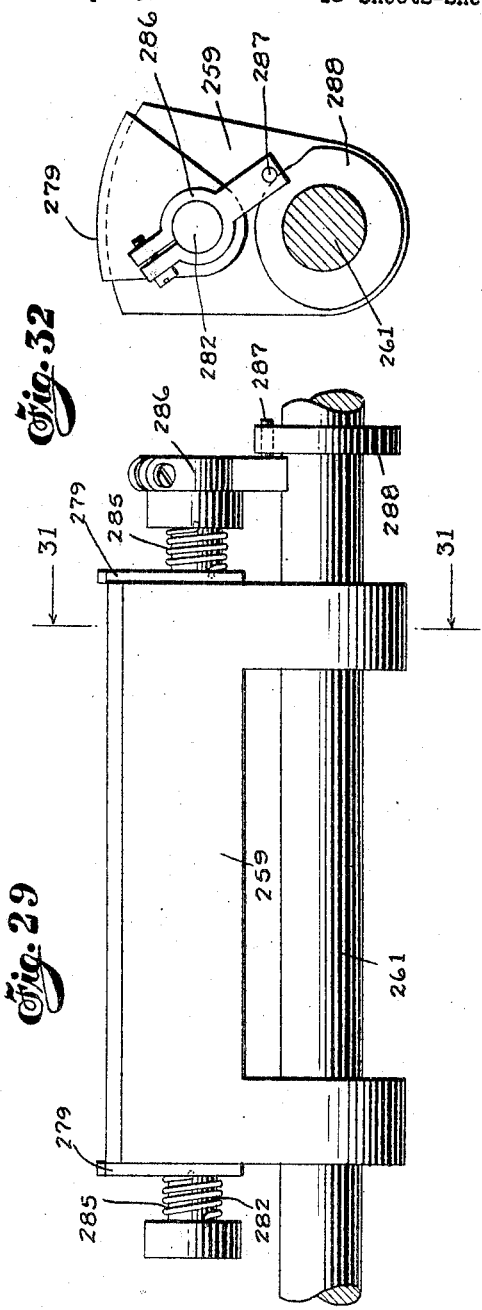

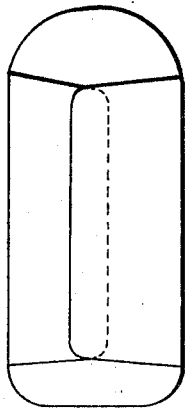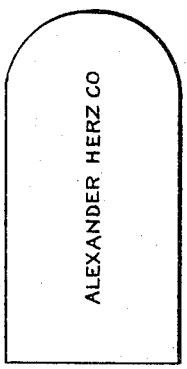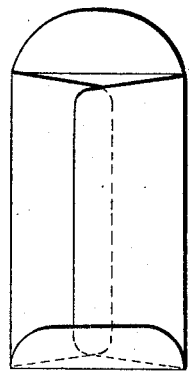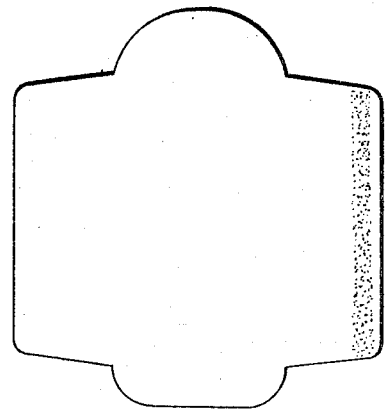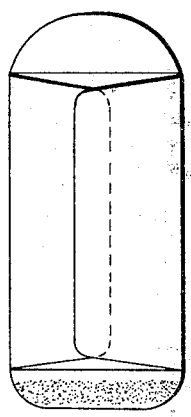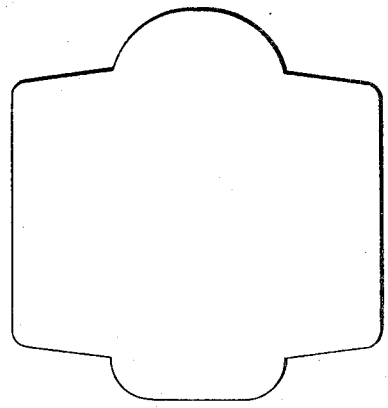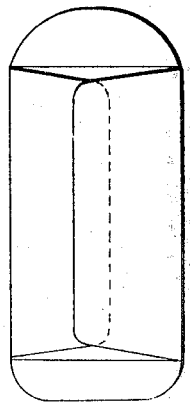

Patented Apr. 19, 1927.

1,625,350

UNITED STATES PATENT OFFICE.

EUGENE CONTI, OF CLIFFSIDE PARK, NEW JERSEY, ASSIGNOR TO ALEXANDER HERZ, OF NEW ROCHELLE, NEW YORK.

MACHINE FOR FORMING, PRINTING, AND ASSEMBLING ENVELOPES.

Application filed September 30, 1921. Serial No. 504,446.

The present invention relates to a machine for forming, printing and assembling envelopes from previously formed blanks, and while its use is not restricted to the formation, printing and assembling of glassine envelopes, it is particularly adapted for that type.

It is an object of the invention to provide for the formation, printing and assembling of envelopes of various sizes.

It is a further object of this invention to provide for the gumming of one side flap of successive envelope blanks, the accurate folding of the side flaps over the body portion of the blanks, and the securing of the flaps together, the gumming of one end flap, the folding of this flap, and the securing of the same to the previously folded and secured side flaps, the creasing of the other end flap, if desired, the accurate printing on the face of the envelope, and the assembling of the completely formed and printed envelopes in predetermined numbers.

Furthermore, the invention comprehends the feeding of the envelope blanks, successively, to the various positions in which an operation is performed on the blanks, and the positioning of the blanks so that the side and end wings will be properly folded, and so that the printing will be aligned and positioned on the face of the envelope.

Various other objects will appear as the description of the invention progresses, and I, therefore, do not deem it necessary to enumerate all the objects at this time.

In the embodiment of the invention disclosed in the drawings, which is merely chosen for the purposes of illustration, and to the details of which I do not wish to be limited, except as is necessitated by the claims, I have shown means for supporting a stack of envelope blanks, each of which blanks includes a body portion, side wings and end wings (see Figure 35). This supporting means for the blanks is in the form of a hopper, from which the blanks are successively separated and withdrawn from the bottom of the stack. The withdrawn blanks are successively carried on to a support, where they are held in position, and an adhesive applied to one edge of one of the side wings of each (see Figure 36), the adhesive applying means being disposed laterally of the path of travel of the envelope blanks, so as not to interfere with the progress of the blanks through the machine. The hopper, together with the means for holding the envelope on to the support, and the means for applying the adhesive to one side wing of the envelope, are adjustable, so that envelope blanks of any size up to a predetermined limit may be operated upon.

From this position, where the blank receives the adhesive on one of its side wings, the blank passes to adjustable mechanism for folding the side wings over the body portion of the blank and one upon the other (see Figure 37), the wings being elevated prior to the arrival of the blank at the position in which the wings are folded, so that the folding means may operate upon the wings.

Prior to the folding operation and in the travel of the envelope blank from the hopper to the folding means the blank is guided, and immediately preceding the folding of the side wings the blank is positioned with respect to the folding means, so that the wings will be accurately folded and the blank with the folded side wings will be in proper position for presentation to the means for applying adhesive to the end wing and to the printing and assembling mechanism, the positioning means being adjustable to accommodate envelope blanks of various sizes.

After the side wings are folded, they are pressed together, to insure the adhesion of the wings, and the blank with these folded side wings is then fed to adjustable means for applying adhesive to one end wing (see Figure 39), and with which a device which will crease the opposite end wing may be associated, if desired.

From the means for applying the adhesive and creasing the end wing of the envelope, the latter passes to means for folding and applying pressure to the end wing to insure its adhesion to the already folded and secured side wings (see Figure 41). The envelope thus formed then passes to an assembling mechanism, first passing through a printing mechanism, which serves not only to print on the face of the envelopes (see Figure 40), but to feed them from the forming mechanism to the assembling mechanism.

Means are provided for indicating the assembly of a predetermined number of formed and printed envelopes, and for indicating the failure of the machine to feed an envelope from the hopper to the various parts of the machine.

In the drawings,

Figure 3 is an elevation looking at the opposite side of the machine;

Figure 4 is an elevation looking at the printing and assembling end of the machine;

Figure 5 is an elevation looking at the opposite or hopper end of the machine;

Figure 6 is a longitudinal, vertical section of the machine with certain parts omitted for the sake of clearness;

Figure 7 is a sectional view of the hopper for the envelope blanks, showing the parts in full lines in the positions they will occupy prior to the separation of a blank from the stack, and in dotted lines in the positions they will occupy during the separation of a blank from the stack;

Figure 8 is an elevation partly broken away and partly in section on the line 8—8, Figures 1 and 9, disclosing the plunger for applying the adhesive to one side wing of the blank, and disclosing also the operating means for the plunger and mechanism for counting the blanks fed from the hopper;

Figure 9 is a plan view of the mechanism disclosed in Figure 8;

Figure 10 is a section taken transversely through the machine on the line 10—10, Figure 1, disclosing the adhesive applying plunger, the operating mechanism therefor, the counting mechanism, and the mechanism for maintaining the blank in position during the application of the adhesive to the side wing;

Figure 11 is a detail of the adhesive applying plunger and the correlated mechanism, the parts being shown in full lines in the positions which they will occupy prior to the operation of the plunger;

Figure 12 is a similar view showing the positions of the plunger and the correlated parts in the positions which they will occupy when the plunger has descended to apply adhesive to the envelope;

Figure 13 is a detail view of the contact for closing the circuit through the counting mechanism;

Figure 14 is a plan view of the reciprocating slide for carrying the envelope blank to the first adhesive applying mechanism and to the folding mechanism;

Figure 16 is a side elevation thereof, the movable jaws of the clamps being shown in their closed positions in full lines and in their open positions in dotted lines;

Figure 17 is a detail showing the means for operating the clamp which engages the envelope blank in its travel from the hopper to the side wing adhesive applying mechanism;

Figure 18 is a sectional view taken on the line 18—18, Figure 1 disclosing the mechanism for folding the side wings of the envelope blank and the driving means therefor;

Figure 20 is a longitudinal, sectional view disclosing the envelope folding and positioning mechanisms;

Figure 21 is a detail of one of the plates for folding the side wings of the envelope blank, the plate being disclosed in its retracted position in full lines, and in its folding position in dotted lines;

Figure 22 is a detail of the abtuments against which the envelope blanks are aligned.

Figures 25, 26, 27, 28 and 29 are details of the means for applying adhesive to the end flap of the envelope blank;

Figure 30 is a sectional detail on line 30—30 of Figure 26;

Figure 31 is a sectional view on line 31—31 of Figure 29, showing the means for clamping and creasing the end wing to which the adhesive has been applied;

Figure 32 is a detail section showing the means for operating the adhesive applying protrusions of the end flap adhesive applying means;

Figure 33 is a detail of the printing mechanism disclosing the means for preventing the contact of the rolls when no envelope is located between the same;

Figure 34 is a detail of the magnetic control for the printing roll controlling mechanism;

Figure 35 is a diagrammatic view of the envelope blank;

Figure 36 is a similar view of the blank with the adhesive applied to one side wing;

Figure 37 is a similar view showing the side wings folded and secured together;

Figure 38 is a similar view showing the end flap creased but not folded;

Figure 39 is a view showing the end flap to which the adhesive has been applied creased;

Figure 40 is a view of the envelope after it has been printed upon; and

Figure 41 is a view of the opposite side of the completed envelope.

Figure 1:
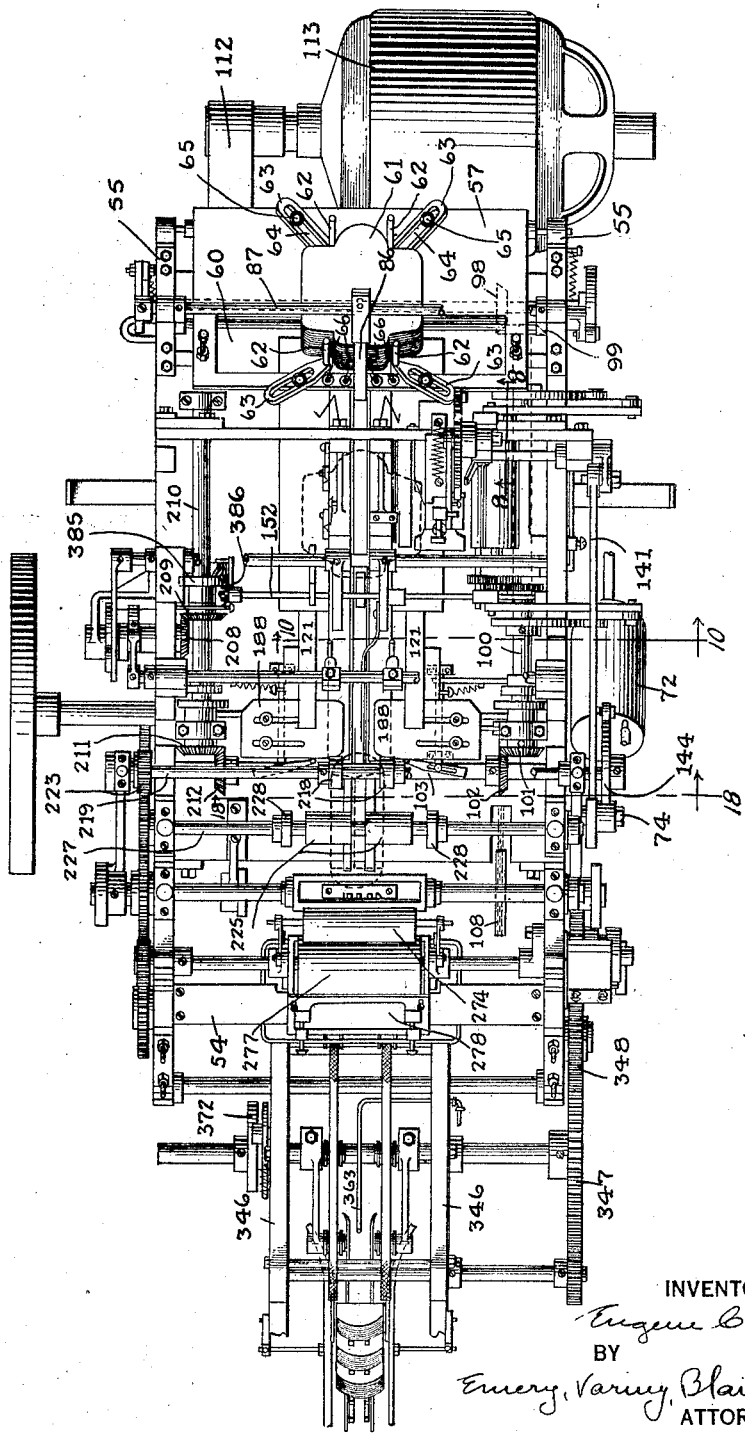
Figure 1 is a plan view of the entire machine with parts thereof broken away to more clearly disclose certain of the parts which would otherwise be obscured.

The embodiment of the invention illustrated in the drawings includes a frame having side pieces 50 and 51, which are held in their proper spaced relation with each other by rods 53, located adjacent to the bases of the side pieces, and by transversely extending plates 54, which act as supports for certain parts of the machine. The hopper for supporting the stack of envelope blanks is mounted on one end of the frame, and includes a pair of spaced cheeks 55. Pivotally mounted on a rod 56, which extends transversely between the cheeks 55, is a supporting plate 57 for the envelope blanks. This plate is inclined upwardly away from its point of pivotal support, and its angular position may be varied by means of adjusting bolts 58, which coact with abutments 59. The forward portion of the plate 57 is recessed as at 60, through which the envelope blanks, which are indicated at 61, in Figures 1, 2, 3, 5, 6 and 7, are withdrawn. Extending upwardly from the plate 57 are standards 62, which coact to maintain the stack of envelopes 61 in proper position on the plate 57, the rods being so arranged that the wings of the envelope blanks extend between them. Each of these rods is provided with an angularly disposed portion 63 having a slot 64 therein, through which a set screw 65 extends. By means of this screw and slot arrangement the standards 62 may be adjusted with respect to each other. The positioning of the envelope blanks 61 between the standards 62 is also assisted by resilient fingers 66, which are mounted on the plate 57 at the forward or upper edge thereof.

Figure 2:
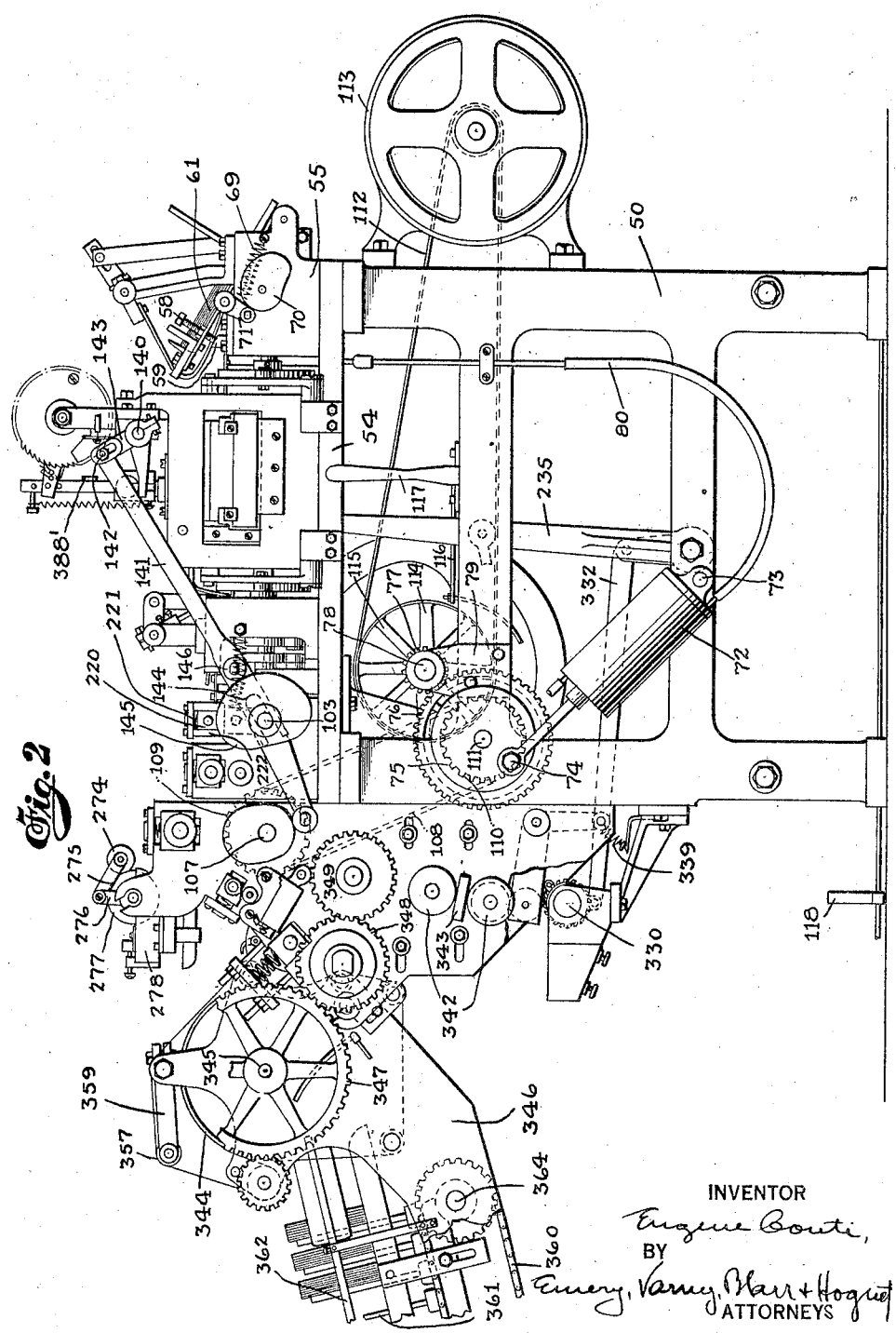
Figure 2 is an elevation looking at one side of the machine.

In order that the forward portion of the lowermost envelope blank 61 may be drawn downwardly through the recess 60, of the plate 57, and separated from the remainder of the stack of blanks, I have provided a pair of suction nozzles or fingers 67, the number of which may, however, be increased or decreased at will, which fingers are pivoted at 68 to swing upwardly through the recess 60 into the position shown in full lines in Figure 7 and downwardly into the position shown in dotted lines. These nozzles 67 are normally pulled downwardly away from the stack of envelopes by a coiled spring 69, as shown in Figure 2, and are raised to engage the lowermost blank of the stack by a cam 70, which coacts with an arm 71, rigid with the nozzles. A suction through the nozzles is produced by a pump 72, shown in the lower portion of Figure 2, which may be any suitable type of evacuating pump, but which I have disclosed, for the sake of convenience, as of a plunger type, the cylinder of which is pivoted at 73 to the side 50 of the frame, and the plunger of which is attached at 74 to an eccentric 75, the eccentric being driven by the intermeshing of a gear 76 with a pinion 77, carried by the main drive shaft 78, which is mounted in bearings 79 on the sides 50 and 51 of the frame. A conduit 80 extends from the evacuating pump 72 and is connected to the nozzles. Interpolated in this conduit 80 is a valve 81, Figure 7, which is normally held closed by a spring 82, and is opened by a rocker arm 83. This arm 83 is actuated by a cam 84, carried by the shaft 85 on which the nozzle actuating cam 70 is mounted.

When it is desired to destroy the suction through the nozzles 67 without stopping the machine or the creation of the suction by the pump 72, it may be accomplished by means of a manually actuated cam 84' shown beneath the stack 61 in Figure 6 of the drawings, which cam is controlled by a handle 85', shown in the left hand upper portion of Figure 3.

When the lowermost blank is partially separated from the stack of blanks, and drawn downwardly into the dotted line position shown in Figure 7, it is engaged at its free forward edge by means which will later be described, which acts to withdraw the blank from the stack. To relieve the blank being withdrawn from the weight of the remainder of the stack, and thus facilitate its withdrawal and prevent the disarrangement of the remaining blanks, I have provided a finger 86, which is adjustably secured to a rod 87 mounted to oscillate in supports 88 which extend upwardly from the cheeks 55. Secured to the rod 87 is a crank arm 89, to which arm a link 90 is pivotally and adjustably attached as at 91. This link 90 extends downwardly and is pivoted at 92 to a lever 93, which carries a cam roller 94, Figure 3, and is pivoted to one of the cheeks 55 at 95. The lever 93 is normally pulled upwardly by a spring 96, and consequently the finger 86 is normally held in its lowermost position as shown in Figure 7, where it engages the then lowermost blank of the stack and slightly raises the entire stack to relieve the weight of the same from the blank being withdrawn. The finger 86 is moved upwardly by the coaction of a cam 97 with the cam roller 94. Thus the finger 86 is oscillated between the positions shown in full lines in Figure 7, where it will permit the partial separation of the lowermost blank from the stack, and the dotted line position shown in this figure, where it will permit the withdrawal of the said blank from the stack, and will relieve the weight of the stack from the blank being withdrawn.

The shaft 85, on which the cams for actuating the suction nozzles and retaining finger are mounted, is driven by a bevel pinion 98, Figures 1 and 5 which in turn is driven by a second bevel pinion 99, on a shaft 100, on the opposite end of which shaft a pinion 101 is secured, Figures 1, 18, 19 and 20. This pinion 101 meshes with a pinion 102 on a shaft 103, which latter shaft is driven by a train of gears 104, 105 and 106, the latter being mounted on a shaft 107, which receives its motion through a chain 108, Figure 2, the chain passing around sprockets 109 on the shaft 107, and 110 on the shaft 111, which latter shaft 111 is driven from the main drive shaft, as has previously been described. The main shaft 78 is driven preferably by a belt 112, which passes around a pulley on the armature shaft of a motor 113, and selectively around a fixed pulley 114 or an idler pulley 115 shown in Figure 2. The belt is shifted from one to the other by the usual shipper means 116 having handles 117 and a pedal 118.

After the envelope blank leaves the hopper it is fed by means which will later be described, to the mechanism for applying an adhesive to one side wing. This mechanism includes a work support or table 119, upon which the sheet indicated by the reference numeral 120 in Figures 10 and 19 rests, and to which it is clamped by strips 121, which extend longituidnally of the machine and guide the blank in its passage therethrough, the strips being supported by downwardly extending arms 122, which are supported by, and laterally adjustable on, a bar 123, which extends transversely of the machine, the adjustment being accomplished by slot and screw connection 124, and being for the purpose of adapting the strips to the handling of envelopes of various sizes. Located to one side of one of the arms 122 is a support for the wing of the envelope blank, to which the adhesive is to be applied. This support 125 is provided with a slot 126, which is bridged by the wing of the envelope blank. Pivotally mounted at 127 on the adjacent arm 122 is a clamp 128, which is provided with an upwardly extending lever 129. This clamp 128 is normally pulled downwardly, so as to engage the wing of the envelope blank which rests upon the support 125 and clamp it to said support, and is retracted from such clamping position by the actuation of the lever 129 in a manner which will later be described. A plunger 130 is mounted for vertical reciprocation in a guide 131, which is supported by the bar 123. This plunger carries at its lower end a plunger blade 132, which is adjustable laterally of the machine by means of bolt and slot connection 133, so that it may be adjusted together with the support 125 to accommodate envelopes of various sizes. The blade 132 is also adjustable longitudinally of the machine by means of screw and slot connections 134, shown in Figure 8 of the drawings, so that the blade may be positioned longitudinally with respect to the wing of the envelope blank. Extending from the plunger 130 is a trip 135, which engages the lever 129, and through said lever retracts the clamp 128 from its clamping position on the support 125 during the upward movement of the plunger 130. This plunger 130 is normally urged downwardly so that the plunger blade will engage that portion of the wing of the envelope which bridges the recess 126 of the support 125 by suitable means such as a coiled spring 137, as shown in Figure 8. It is moved into its uppermost position by a rocker arm 138, which engages a roller 139, carried by the plunger. This rocker arm 138 is secured to a shaft 140, which is supported for oscillation. The shaft 140 is oscillated by a link 141, see Figure 2, which is adjustably pivoted at 142 to an arm 143, secured to the shaft 140. This link 141 is bifurcated at 144 and straddles the shaft 103, by which it is supported for sliding movement. A cam 145, mounted on the shaft 103, cooperates with a roller 146 on the link 141, and imparts the necessary movement to the link 141. The plunger blade 132 is supplied with adhesive by a roller 147, Figures 8, 11 and 12, to which adhesive is applied by a roller 148 from a trough 149. The roller 147 is mounted for rotation on a shaft 150, which shaft is supported in bearings 151, Figures 9 and 10. These bearings are adapted to reciprocate on rods 152, and the movement of which bearings 151 towards the plunger blade 132 is produced by a suitable means, such as a coiled spring 153, the movement in this direction being limited by stops 154, adjustably mounted on the rods 152, the adjustment being to vary the extent of travel of the roller 147 to the various positions of the plunger blade 132. The roller 147 is moved to the adhesive applying roller 148 by rocker arms 155, which are connected to the slidable bearings 151 by links 156, which are pivoted at 157, and are provided with cam rollers 158, which cooperate with cams 159 mounted on the shaft 100.

In order that the roller 147 may be rotated while it is in contact with the adhesive supply roller 148, the shaft 150 on which the roller is mounted is provided with pinions 160, which intermesh with gears 161 secured to a shaft 162 and intermeshing with gears 163 on the shaft 100. Thus, when the roller 147 is moved into engagement with the roll 148 the pinions 160 mesh with the gears 161, and the roller is rotated so that the adhesive is collected by its entire surface. Furthermore, when the roller contacts with the lower edge of the plunger blade 132, it is rotated by the contact, and thus a sufficient quantity of the adhesive is wiped from the roller on to the blade.

The envelope blank, after having received the adhesive on one side wing, is then carried into position for the folding of the wings, in its travel passing upon the previously described strips 121, and being guided thereby, and also being held in position by followers 164, pivoted to one of the arms 122, and resting upon the blank by gravity, and which are limited in their upward movement by springs 165, as shown at the left side of Figure 10.

When the blank arrives in the location where the side wings are folded into overlapping relation, and on to the body portion, it is positioned with respect to the folding means so that the wings will be properly aligned and so that the partly formed envelope will complete its travel through the machine to the various other operating parts in proper position. This positioning means includes a pair of movable abutments 166, shown in Figures 19 and 22. These abutments are adjustably mounted by means of slot and screw connections 167, on bell crank levers 168, which are pivoted at 169, the adjustment being to permit the abutments to move to various extents into the path of movement of the envelope blanks, so that they may be adapted to envelopes of various sizes. The abutments are normally moved into the path of travel of the envelope blanks so as to engage the leading edges of the side wings by suitable means, such as coiled springs 170, and are retracted by the cooperation of cams 171 with cam rollers 172, see Figure 22, the said cams 171 being mounted on shafts 100 and 210 driven by suitable gear connection with the main drive shaft. Adjustably mounted on a transversely extending shaft 174 are depending fingers 175, Figures 19 and 20, which are adapted to engage the edges of the side wings opposite to those engaged by the abutments 166, to cooperate with the abutments to align the envelope blank with respect to the folding mechanism. These depending fingers 175 are oscillated first to permit the envelope blank to pass beneath them, and then to engage the blank to align it, by a crank arm 176, Figure 3, which is drawn downwardly by suitable means, such as a coiled spring 177, and is moved upwardly by the coaction between the cam 178 on the link 181, and a cam roller 179.

Figure 19:
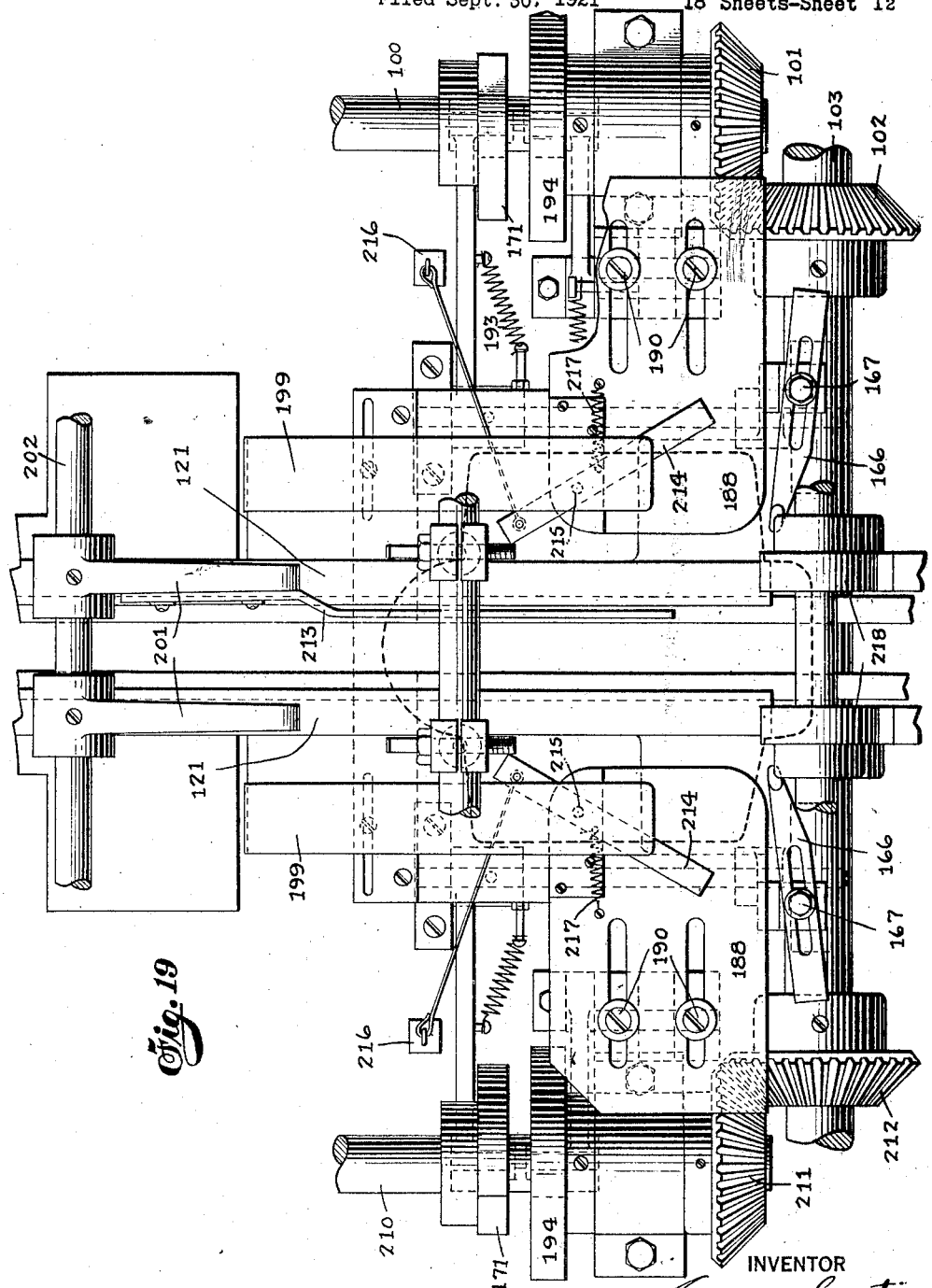
Figure 19 is a plan view of the mechanism shown in Figure 18.

The means for folding the side wings of the envelope blank operates after the blank has been aligned by the positioning means, and this folding means consists of the mechanism which is disclosed in Figures 18, 19 and 21 in detail. This mechanism includes a pair of transversely reciprocatory plates 188, which are adjustably and pivotally mounted on the upper ends of bell crank levers 189, the adjustment being secured by the screw and slot attachment 190, disclosed in Figure 19, and the pivotal movement by the pivot at 191. The blades 188 are normally held so that their leading edges are in their lowermost positions by suitable means, such as coiled springs 192, and against the action of which the said leading edges may rise in a folding operation, in a manner which will later be described. The plates 188 are normally urged into their folding or innermost positions by springs 193, and are retracted by cams 194, which cooperate with cam rollers 195, on the bell crank levers 189, the cams being mounted on shafts 100 and 210, which shafts are driven by suitable driving connections with the main drive shaft. In the inward movement where they cooperate to fold the side wings of the envelope blank, the plates 188 ride upon the surface of the support 197, shown in Figure 21, and the inner or folding edges of the same are raised by cams 198, so that the wings of the blank will be folded over the edges of the strips 121. It is obvious that before the side wings of the envelope blank can be engaged and folded by the folding plates 188, the wings must be somewhat elevated to permit the passage of the plates under the same. This elevation is accomplished by a pair of guides 199, which incline upwardly from the base 200 where they are attached to the envelope supporting table 200', Figure 20, and at their highest points are unattached.

During the folding of the side wings of the envelope the body portion thereof is located beneath the strips 121, which have previously been described, and against the edges of which the wings are folded. These strips 121 extend from the hopper to the end wing creasing mechanism which will later be described, and are normally spaced from envelope supporting table 200'. During the folding of the side wings, however, the blanks are held tight against the supporting table by fingers 201, which are adjustably mounted on a transversely extending shaft 202, and which are oscillated by said shaft. These fingers are moved downwardly into contact with the strips 121, during the folding operation, and are moved upwardly out of contact with said strips to relieve the pressure on the envelope blank after the side wings have been folded and when the blank is moved to be further operated upon. The shaft 202 is oscillated by an arm 203, Figure 3, which is secured to one end of the shaft, and is provided at the other end with a cam roller 204, which rides on a cam 205, being held in contact therewith by a spring 206. The cam 205 is so designed that the fingers 201 are in lifted position to relieve the pressure upon the guides 121 during the operation of the registering devices and after registration the shaft 202 is rocked to cause pressure to be exerted upon the guides 121 to clamp the blank firmly in position during the operation of the folding devices. This cam 205 is mounted on a shaft 207, one end of which has secured thereon a beveled pinion 208, which pinion meshes with the pinion 209, Figure 1, on a shaft 210 which latter shaft is driven by a pinion 211 meshing with a pinion 212 on the shaft 103.

A rod 213 is secured to one of the fingers 201 adjustably, as shown in Figures 19 and 20, and extends between the guides 121 but is slightly raised above the plane of the same and is located at one side of the center of the space between said guides 201. When the plates 188 fold the side wings of the blank into overlapping relation, the rod 213 acts to retard the arrival of the adjacent wing in its ultimate position. In other words, it permits the wing on the opposite side of the blank to be folded flat against the body of the blank, but prevents the other wing from being folded flat against the body, and therefore maintains it in a position spaced above the first mentioned wing. The function of this rod, therefore, is to insure the wing to which the adhesive has been applied overlying the wing to which it is to be attached, and the rod is so disposed that after the wings have been folded the blank with its folded wing may be withdrawn and passed on to the subsequent operating means.

When very large envelopes are being handled, it is desirable to provide means for assisting the plates 188 to fold the wings. This means, of course, may be of various forms, so that it comes into operation subsequent to the initial folding by the plates 188. In the form illustrated in the drawings the means consists of a pair of wipers 214, which are pivoted at 215 to the plates 188. One end of each of the wipers 214 is anchored to the machine by suitable means 216, and the wipers are held in their retracted or inoperative positions by springs 217. When the plates 188 move into their operative positions, the anchoring of the wipers cooperating with the movement of the plates 188 swings the wipers pivotally so that by the time the plates 188 have initially folded the side wings of the envelope the wipers will be brought into play to complete the folding operation. These wipers are desirable only when large envelopes are being handled, and may be omitted when the envelopes are of such size that the plates 188 will be sufficient to complete the folding operation.

I have provided means for withdrawing the blank with the side wings folded from the folding means, and for creasing the wings, so that they will lie flat against the body portion of the envelope blank. While many forms of mechanism may be used for this purpose, I have shown one embodiment which consists of a pair of pressure rollers 218, mounted on a shaft 219, which shaft is supported at each end by a vertically movable bearing 220,—Figure 2—which bearing is normally depressed so that the rollers will be held in contact with the work supporting table by springs 221, and which are slidable in carriers 222. These carriers 222 are pivotally mounted on the shaft 103, so that the shaft 219 and rollers may oscillate about the shaft 103 as a pivot. The shaft 219 carrying the rollers 218 is rotated by a pinion 223, Figures 1 and 3, which intermeshes with, and rides peripherally on, the gear 104, which is driven in the manner previously described. As best shown in Figures 2 and 3 the oscillatory movement of carriers 222 about the shaft 103 as a center is controlled by means of the arms 222' which engage cams 222'' on shaft 107. When the folding plates 188 are moved to their operative or folding positions, the rollers 218 are retracted from their path of movement, and thus do not interfere, but upon the retracting of the plates 188 to their inoperative positions the rollers 218 are moved into contact with the upper surface of the envelope blank by the oscillation of the shaft 219, and cooperating with a segment 224 which engages the lower surface of the envelope blank, withdraw the blank from the folding mechanism and pass it between a pair of pressure rollers 225, which cooperating with pressure rollers 226, complete the flattening and creasing of the side wings on the envelope body. The shaft 227, on which the rollers 225 are mounted, and which is provided with additional rollers 228, for use when a large envelope is being operated upon, is rotated by the intermeshing of a gear 229 on one of its ends with gears 230 and 231, which intermesh with each other, and with the gear 229, and the gear 106, which receives its motion as has hereinbefore been described.

Means is provided for withdrawing the lowermost blank from the stack, for conveying it to the means for applying the adhesive to one side wing, and then conveying it to the folding and positioning means. This conveying means comprises a reciprocatory slide 232, Figure 6, which is mounted to slide on a table 233 having a slot 234 therein. The slide is given its motion by a lever 235, which is pivoted at 236 to the frame of the machine, and is connected to the slide by a link 237. The lever 235 is actuated by a link 238, which is connected to an eccentric 75 mounted on the shaft 111, see Figure 6. A clamp having a stationary jaw 240 and a pivoted jaw 241 is located at one end of the slide 232 and is adapted to engage the leading edge of the envelope blank to withdraw it from the stack of blanks and convey it to the means for applying the adhesive to one side wing. The movable jaw 241 is mounted on a shaft 242, and is provided with a depending lug 243, which is engaged during the movement of the slide 232 toward the right by a projection 244 on the table 233, which engagement closes the jaw 241 when the clamp reaches a position to receive the envelope blank in the hopper. This jaw is provided with a second lug 243' positioned to project downwardly when the jaw is closed and lying in a different plane than the lug 243. This lug engages a suitably positioned stop to open the jaw when the envelope blank reaches the position for receiving the adhesive on the side wing. The movable jaw 241 is held in both its opened and closed positions by suitable means, such as a coiled spring 245, which is connected to a crank 246 on one end of the shaft 242 and to a crank 247 on a movable jaw 248, at the opposite end of the slide 237. This movable jaw 248 cooperates with a stationary jaw 249 to form a clamp to engage the leading edge of the envelope blank to withdraw it from the means for applying the adhesive to the side wing of the blank and convey it to the side wing folding means and positioning means. The movable jaw 248 is provided with a depending lug 250, which is adapted to be engaged by a lug 251 on a slidable actuating bar 252. This bar 252 is mounted on the slide 232, and is provided with a lug 253, which is engageable with a projection 254 on the table 233 to move the bar 252 in one direction to open the movable jaw 248, this opening of the jaw being accomplished when the slide 232 has reached such position in its reciprocation that the envelope blank is in the location where it is positioned prior to the folding of the side wings. The spring 245 normally operates to close the jaw 248 but is prevented from doing so after the jaw has been opened by the bar 252 to release the envelope blank by a catch 255, actuated by a spring 256, which catch engages the bar 252 to maintain the jaw 248 in its open position. The catch 255 is released by its engagement with a projection 257 on the table 233 in the movement of the slide 232 to a position where the clamps at each end thereof engage envelope blanks.

From the pressure rollers 225 the envelope blank with the side wings folded and secured together by the adhesive passes to means for applying adhesive to one end wing for folding and securing the wing, and for feeding the envelope thus formed to the printing means. This means may, of course, be of various forms, but as exemplified in the drawings, includes a pair of cooperating plates 258 and 259, Figures 23 and 24, the former being arranged above the latter and mounted to rotate with a shaft 260. The latter or lower plate is mounted to rotate with a shaft 261. The shaft 260 is driven by intermeshing gears 262, 263, 264 and 106, the latter of which receives its motion in a manner hereinbefore described. The lower shaft 261, on which the plate 259 is mounted, receives its motion from the gear 263 in the train which has just been described. The upper plate 258 is recessed at 265, see Figures 27 and 30, and within the recess a bar 266 is slidably mounted. This bar is normally urged outwardly by springs 267, being guided by pins 268 and carrying at its ends rollers 269, for a purpose which will later be described. Projecting from the outer face of the bar 266 are projections 270, which are formed on a plate 271 removably attached to the bar 266 by suitable means, as screws 272, so that the plate can be removed and a larger or smaller plate with a different number of projections substituted in lieu thereof, as is necessitated by the operation on a different size envelope blank. These projections are adapted to register with depressions 273 in the lower plate 259, Figures 28 to 32, when the plates 258 and 259 are rotated to their cooperating positions. During the rotation of the plate 258, the projections 270 wipe the adhesive applying roller 274, Figures 23 and 24, which is mounted on pivoted arms 275, supported by standards 276. The roller 274 is kept in contact with an adhesive supply roll 277, which receives the adhesive from a trough 278 by gravity, which arrangement of the roller 274 permits the forcible contact between the roller and the projections 270, and the raising of the roller 274 to relieve the resultant pressure. The envelope blank with the side wings folded is fed between the plates 258 and 259 by the pressure rollers 225 and 226,—Figure 6—and the adhesive is applied to the end wing by contact with the projections 270, which carry the adhesive from the supply roller 274.

In order that the end wing of the envelope blank may not be forced into the depressions 273 by the projections 270 and thus mutilated, I have provided the rollers 269 hereinbefore referred to. These rollers engage cams 279 carried by the lower plate 259 when the projections are about to register with the depressions and before they contact with the wing of the envelope blank. This contact between the rollers 269 and the cams 279 forces the bar 266, Figure 30, into the recess 265, and brings the projections 270 into such position that they protrude only slightly from the recess.

The object in providing the projections 270 and the depressions 273, rather than continuous adhesive applying surfaces, is so that when an envelope is not fed between the plates during the operation the adhesive carried by the upper plate will not be applied to the lower plate but will simply be carried into the depressions therein. This relieves the possibility of the lower plate receiving an application of adhesive and transmitting it to the next succeeding envelope blanks with the obviously undesirable result.

When the envelope blank is fed between the plates 258 and 259 the wing is engaged at its junction with the body portion of the envelope blank, so that the blank will be held during the application of the adhesive to the end wing and subsequently to the application will be fed through the adhesive applying plates. Various means may be provided for the holding and feeding of the envelope blank in this manner. The means which I have illustrated in the drawings includes a stationary grip 280 and a movable grip 281, the latter being secured to an oscillatory shaft 282 within the plate 259. These grips 280 and 281 form between them a recess 283, into which the end wing of the envelope blank is forced by a blade 284, carried by the upper plate 258 adjacent to the projections 270. The grips 280 and 281 are normally held separated by springs 285, Figures 28 and 29, which cooperate to move the shaft 282 in one direction, but the movable grip 281 is actuated to coact with the stationary grip 280 to hold the end wing of the envelope blank after it has been forced into the recess 283 by the cooperation between a crank 286 secured to the shaft 282 and carrying a roller 287 with a cam 288, which is secured to the shaft 261 on which the upper plate 259 is mounted.

The upper plate 258 carries a projection 289, to which a blade 290 may be secured. This blade is adapted to cooperate with slots 291 in a curved plate or table 292 which is secured to the shaft 261 on which the lower plate 259 is mounted. When the blade 290 is used it engages the end wing of the envelope blank opposite to that to which the adhesive has been applied and creases the same in the slots 291. As hereinbefore stated, the plate 290 is removable, so that it may be used or dispensed with as desired, for in some instances it is desirable to crease the end wing of the envelope blank as stated, and in other instances it is not desirable so to crease it.

Figures 23, 24:
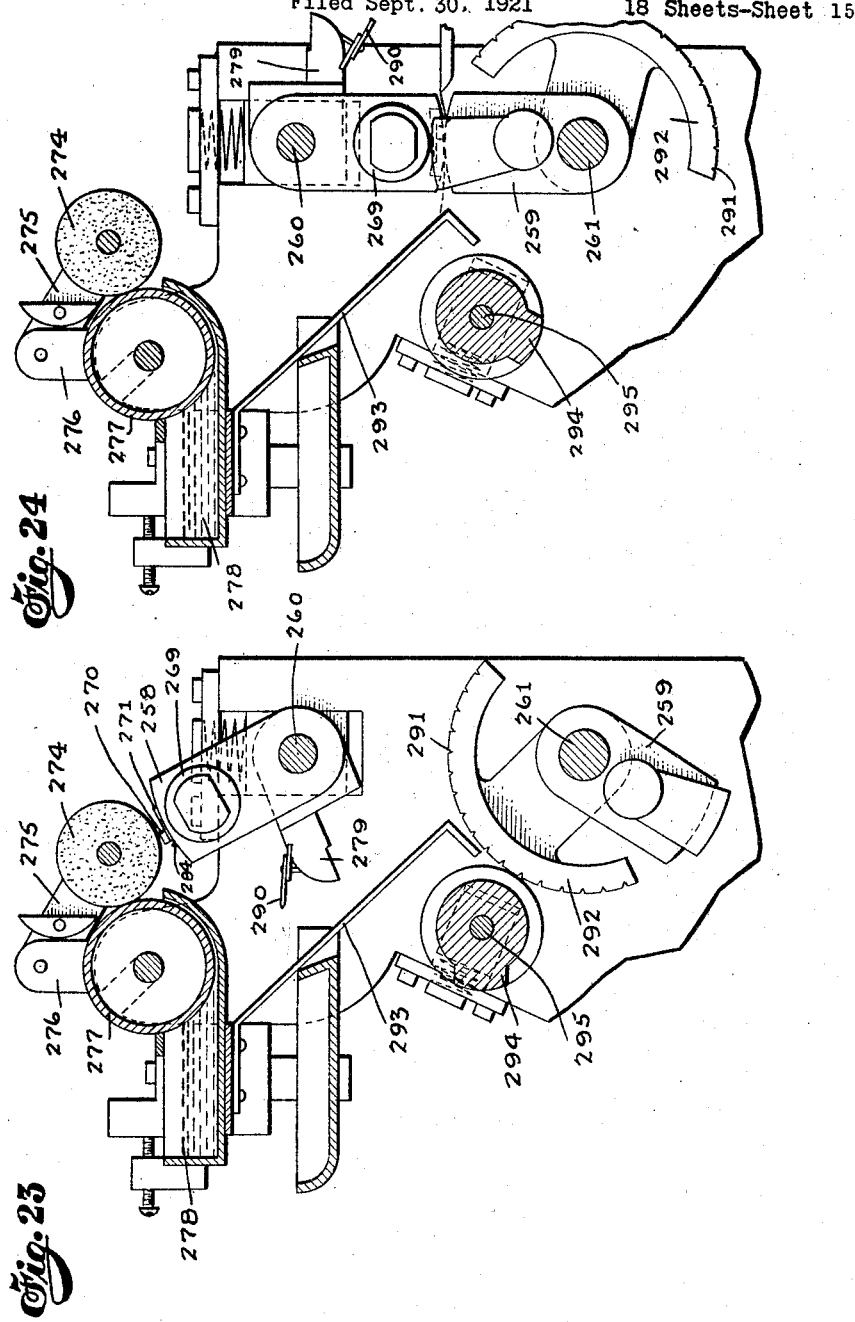
Figures 23 and 24 are sectional details of the mechanism for applying adhesive to one end flap of the blank, for creasing and folding the said flap, and for creasing the opposite end flap.

After the adhesive has been applied to the end wing of the envelop blank, the grips 280 and 281 crease and hold the end flap and as these members continue their rotation, the end flap is folded back against the body of the envelope by the wiper 293 as indicated in Figure 24. The flap of the envelope is pressed firmly against the body of the envelope between the full sized portion of the roll 294 and the bearing surface of plate 259. The adhesive coated flap is thus forced into contact and secured to the previously folded and secured side wings. The closure flap is creased during the continued movement of the blank between the creaser blade 290 and one of the cooperating grooves or slots 291.

During the continued movement the envelope lies against the movable table 292 and is held thereagainst by the roller 294. The grippers 280, 281 release the envelope at a suitable time to permit it to pass between the printing rolls. The shaft 295 is driven by a gear 296, which meshes with the gear 106.

A pair of rolls 297 and 298, which cooperate to print on the envelope and to assist in feeding it to the assembly means, are mounted on shafts 299 and 300 to receive the envelope as it is fed from the means for creasing the end wing thereof, the envelope being held on the roll 297 by the cam actuated grippers or fingers 323, Figure 33, which are actuated in a manner later described. The shaft 299 is driven by a gear 301, which meshes with a gear of similar size 302. This gear 302 in turn meshes with a gear 303, which is driven by the gear 106. The gear 302 actuates the lowermost roll 298. The shaft 299 is supported in movable bearings 304, which slide in openings in the side plates 305 of the frame of the machine. These bearings are normally urged toward the roll 298 by suitable means, such as adjustably tensioned springs 306, so that the roll 297 is yieldably pressed into contact with the printing type on the roll 298. This bed 307 is a segment of a cylinder, so that it intermittently engages with the type during the rotation of the rolls 297 and 298. As the envelope is fed from the means for creasing the end wing thereof, it passes down a raceway 308, and between the rolls 297 and 298, where the printing is impressed thereon. Because of the rotation of the rollers and the pressure exerted one upon the other, the envelope is fed between the same and to the means for conveying it to the assembling means, which conveying and assembling means will later be described.

It is of course desirable to prevent the contact of the type on the roll 298 with the printing pad 307 when no envelope is present between the type and bed and I have, therefore, provided means which will maintain the type and bed separated in the absence of an envelope between the same. The embodiment of this means, which is disclosed in the drawings, and particularly in Figures 33 and 34, includes a cam 309, which is mounted on the shaft 299 and which cooperates with a roller 310. This roller 310 is supported on an arm 311, pivoted at 312 to one side of the frame. The roller 310 is held in contact with the cam 309 by coiled spring 213 and thus the roller 310 is free to move under the action of the cam 309 and the springs 306 to permit the contact of the type with the printing bed 307, when the free end of the arm 311 is unsupported. During the normal operation of the machine, when an envelope passes between the rolls 298 and 299, the springs 306 cause the movement of the roll 297, so that the type on the roll 298 and the printing bed 307 will exert pressure on the envelope disposed between the rolls.

In order that the movement of the roll 297 toward the roll 298 may be arrested before they are sufficiently close to permit the contact of the type with the bed 307, when no envelope is between the rolls, I have provided means for supporting the free end of the arm 311, which support makes the arm a rigid stop to prevent the downward movement of the rolls 297. This means includes a stop 314, which is pivoted on a shaft 315, which stop is normally urged into the path of movement of the end of the arm 311, to support the same and prevent the downward movement of the roll 297. The movement of the stop 314 into the position described, which is illustrated in dotted lines in Figure 33, is prevented when an envelope is present between the rolls by the coaction between a latch 316, carried by the shaft 315, and a magnetically controlled trip 317, which engages a shoulder on the latch. An electric circuit is established through the magnet 318 when no envelope is present between the rolls 297 and 298, through a contact 319, which permanently engages one end of the shaft 299, through a conduit 320 to a source of electric energy, through a conduit 321 to the magnet 318, through a conduit 322 to the pivoted fingers 323, which are adapted to engage a contact 324 on the leading edge of the printing bed 307, and which are brought into engagement with the contact 324 when no envelope is located between the contacts to insulate them one from the other by a cam 325, which is mounted on the shaft 299 and cooperates with a lever 326 rigidly associated with the contact 323. When the circuit is thus closed, the magnet 318 is energized and the trip 317 moved so as to withdraw its support from the shoulder of the latch 316. When the trip is thus withdrawn, the stop 314 moves into the dotted line position shown in Figure 33, engages the free end of the arm 311 and prevents the movement of the bed 307 into contact with the type on the roll 298.

The trip 317 again moves into position to engage the shoulder on the latch 316, when the circuit in which the magnet 318 is interpolated is broken by the disengagement of the contacts 323 and 324 under the action of the cam 325, and the latch 316 is moved to such position that the trip 317 will engage the shoulder by a cam 327 on the shaft 300, which in its rotation engages an arm 328 rigid with the shaft 315. The engagement of this cam with the arm oscillates the shaft 315 and permits the engagement of the trip 317 with the shoulder of the latch 316. Thus, when no envelope is present between the type and the printing bed, these elements are prevented from contacting and consequently the printing bed is not coated with ink.

The type carried by the roller 298 is supplied with ink from a trough 329, which is mounted on one side of the frame of the machine through a series of rolls. Mounted within the trough is a roll 330, which is intermittently rotated by a pawl and ratchet 331, the pawl being actuated by an arm 332, which is connected to a crank 333 on the oscillatory shaft 236. The ink is conveyed from the roll 330 to the type by an oscillatory roller 334, through a pair of relatively large rollers 335 and adjustable rollers 336. The oscillatory roller 334 is carried by a bell crank lever 337, pivoted at 338, and actuated by the reciprocation of the arm 332, and a spring 339, see Figures 3 and 6.

In order that the ink may be evenly distributed on the rollers 335 and 336, and consequently on the type, I have mounted the rollers 335 so that they are free to move longitudinally during their rotation. On one end of each of the shafts of the rollers 335 is a gear 340, which gears are driven from the gear 302 by relatively smaller gears 341. On the opposite end of each of the shafts of the rollers 335 are cam slots 342, into which a stationary projection 343 extends. It will be obvious that the rollers being free to move longitudinally, the stationary projection 343 causes the longitudinal movement during rotation by its coaction with the cam slots 342. This longitudinal movement of the rollers during their rotation distributes the ink in an even film so that it is evenly applied to the type.

The envelopes having been printed upon in their passage between the rolls 297 and 298, are fed by these rolls to the means for transferring the envelopes to the assembling means. The embodiment of this transferring or conveying means illustrated in the drawings, and particularly at the left hand side of Figure 6, consists of a drum 344, which is mounted on a shaft 345, journaled in an extension 346 of the frame, and rotated by a gear 347, which meshes with a gear 348. This gear 348 meshes with a similar gear 349 mounted on the shaft of the roll 298. A pair of belts 350 pass around the drum 344, and around idlers 351, 352 and 354, the latter of which are adjustable to tighten the belts. The drum 344 and the idlers 352 are so located with respect to the upper printing roll 297 that the belts pass in contact with the surface of this roll, as shown at Figure 6. A second pair of belts 355 pass around idlers 356, 357, 358 and 353. The idlers 357 are mounted on adjustable arms 359, which are for the purpose of tightening the belts. The belts 355 pass around the upper portions of the drum 344, as disclosed in Figure 6, and the belts are moved by the frictional contact with the drum 344.

Disposed adjacent to the drum 344, and mounted on the extension 346 of the frame, is the assembling mechanism, which includes an endless conveyor 360, having extending arms 361, which upon their movement with the upper reach of the conveyor pass between adjustable side guides 362 in positions to receive the envelopes when they are discharged from between the belts 350 and 355.

A pressure nozzle 363 is located between the sections of the drum 344, and directed toward the assembling mechanism so that when the envelopes are released by the belts 350 and 355, they are carried by air pressure against the adjacent arms 361. Furthermore, the air, which may be either hot or cold, is directed against the printed side of the envelope and thus initially dries the ink before the envelope is stacked. Smearing of the ink is thus prevented.

Thus when the envelopes have been printed upon, they are successively fed to the belts 350 by which they are carried upwardly between the belts and the upper printing roll 297, until they pass between the belts 350 and the belts 355 by the cooperation of which they are gripped and carried around the drum 344 and released thereby adjacent to the assembling mechanism. Upon their release the air pressure from the nozzle 363 projects them against the adjacent arm 361, and they are thus assembled in predetermined numbers.

The number of envelopes in each group is controlled in the following manner: As the successive envelopes are released from the belts 350 and 355, they are projected against the adjacent arm 361, as has hereinbefore been stated, and the projection continues against the same arm until the conveyor 360 is moved to bring the next succeeding arm into a receiving position. The movement of this conveyor to bring the succeeding arms into receiving position is controlled as follows: Mounted on the end of the shaft 364 on which the driving gear 365 of the conveyor 360 is mounted, is a ratchet 366, which is actuated by a pawl 367 to intermittently move the ratchet. To one end of this pawl at 368 is pivoted a link 369, which is slidably mounted on the shaft 345 of the drum 344, and which carries a cam roller 370. The link 369 is normally pulled downwardly by a spring 371, so that the pawl 367 is moved in a direction to rotate the ratchet 366 one step. A cam 372, having double actuating faces, is secured to the shaft 345 and during a rotation of the shaft engages the cam roller 370 twice, lifting the same and thereafter permitting the downward movement of the link 369 under the influence of the spring 371.

The downward movement of this link 369 to a sufficient extent to rotate the ratchet 366 one step, is prevented except at predetermined times by the engagement of a magnetically controlled stop 373 with a projection 374 on the link. When the magnet 375 controlling this stop is energized, the stop is moved to disengage the projection 374, and permit the complete downward movement of the link 369.

The energization of this magnet is controlled in the following manner: Mounted on a shaft 376 adjacent to the adhesive applying plunger 130, see Figure 8, is a ratchet 377, having a predetermined number of teeth and which may be removed and one having a different number of teeth substituted therefor. This ratchet is normally engaged by a spring-pressed pawl 378, which is mounted on a pivoted arm 379 the pivot of the arm being the shaft 376. The free end of the arm 379 extends between a pair of pins 380, which project from the plunger 130. During each downward movement of the plunger 130 the engagement of the upper pin 380 with the arm 379 moves the pawl 378 into engagement with the next lower succeeding tooth with which it is already engaged, and during the upward movement of the plunger the lower pin 380 engages the arm 379 and moves the same so that because of the interengagement of the pawl 378 and the ratchet 377 the ratchet is moved one step of its rotative movement. An electric contact 381 is located on the ratchet 377, and when the ratchet has completed one rotation it engages a contact 382 to close the electric circuit. This circuit extends from a suitable source of electric energy to the electromagnet 375, at the right hand of Figure 3, controlling the stop 373, from the magnet through a suitable conductor, such as the frame of the machine, to the contact 381 on the ratchet 377, and when the contact engages the contact 382 the circuit is completed through this contact and a conductor 383 back to the source of energy. Thus, during the rotation of the drum 344, the link 369 is actuated each time an envelope is discharged from the drum but its movement is not sufficient to move the ratchet 366, because of the engagement of the stop 373 with the projection 374. Each time the ratchet 377 completes one rotation, the magnet 375 is energized and the stop 373 withdrawn, so that upon the next downward movement of the link 369 the ratchet will be actuated and the conveyor moved one step. As the ratchet 377 is actuated one step in its rotation, each time an envelope is operated upon, the number of envelopes assembled in a group in the assembling mechanism will be controlled by the number of teeth on the ratchet 377, and thus by varying the number of teeth, by interchanging ratchets, the number in each group of assembled envelopes may be changed as desired.

In order that the ratchet 377 may not be actuated and that the operator may be notified when no envelope is fed into the position where the one side wing thereof receives the adhesive (such as shown in Figure 9), I have mounted the rod 152 so that it is free to oscillate and have mounted thereon an electric contact 384, shown in detail in Figure 13, which is adapted to engage the envelope blank when one is in position to receive the adhesive or to engage the bed of the machine and close a circuit through the signal when there is no envelope present. This rod 152 is given its oscillatory movement by a cam 385, and a spring 386, see Figure 1, so that it is raised to permit an envelope to be fed thereunder, and then lowered, either into contact with the envelope or with the bed of the machine. It is again raised to permit the envelope to which the adhesive has been applied to pass on to the positioning mechanism and to permit the next succeeding envelope to be fed into the position for receiving the adhesive on its side wing.

Furthermore when the contact 384 engages the bed of the machine it closes a circuit through a magnet 384' which withdraws a stop (see Figure 8), similar to the stop 317 shown in Figure 34 from a slide 385', thus permitting the slide to move in its guide 386' under the influence of a spring 387', into the downward path of movement of the block 388' on the slide 130. This engagement prevents the spring 137 from moving the slide 130 sufficiently to engage the pawl 378 with the next succeeding tooth of the ratchet 377. Consequently the ratchet does not rotate when no envelope passes through the machine, and the packaging of the envelopes in full numbers is insured.

Summarizing the operation of the machine, the envelope blanks which are assembled in the hopper in a stack are first partly separated from the stack, and are then gripped, withdrawn from the stack, and moved to a position where adhesive is applied to the side wings. During this withdrawal, the remaining blanks of the stack are raised, to relieve the weight from the blank being withdrawn. After the adhesive had been applied to one side wing of each succeeding envelope, the blank is again gripped and moved to a location where the side wings are folded. Having arrived at this position, the blank is aligned and positioned with respect to the folding mechanism before the operation of the latter. After the aligning of the blank the side wings are folded, so that the wing with the adhesive thereon overlies the opposite wing. The blank with the side wings thus folded, passes on through means for creasing the wings and forcing the wings together, so that they will be secured by the adhesive, and from this mechanism to the mechanism for applying adhesive to one end wing, creasing the wing, and forcing it into contact with the already folded side wings and creasing the opposite end wing, if desired. From this mechanism the thus completed envelope passes to the printing rolls, where the printing is impressed upon its face and by which it is fed to the mechanism for conveying it to the assembling mechanism. This conveying mechanism picks the envelope up from the printing rolls, and carries it into a position opposite the assembling mechanism, where it is forced by air pressure into the latter mechanism, and the succeeding envelopes assembled in groups of predetermined and variable numbers.

What I claim is:

1. In a machine of the class described, a reciprocatory adhesive applying plunger, a reciprocatory adhesive carrying roll for supplying the plunger with adhesive, and means controlled by but supported independently of the plunger for holding an envelope blank in position to receive the adhesive.

2. In a machine of the class described, a reciprocatory adhesive applying plunger, a stationary bed, means for supporting an envelope blank arranged to yieldably support the adhesive receiving portion, and means for holding the blank upon said bed during the application of the adhesive.

3. In a machine of the class described, means for supporting an envelope blank in such position that a portion thereof is yieldable, an adhesive applying member, means for moving said member to engage and flex said yieldable portion of the envelope blank, and means for holding the envelope in position during the application of the adhesive.

4. In a machine of the class described, an adhesive applying plunger, means for supporting an envelope blank, means supported independently of the plunger for holding the blank in position, means for automatically rendering said holding means operative, and means on the plunger for controlling the operation of said holding means.

5. In a machine of the class described, a reciprocatory plunger for applying adhesive to an envelope blank, a pair of spaced members for supporting the envelope blank with the adhesive receiving portion therebetween, and means for clamping the blank to one of said members.

6. In a machine of the class described, a reciprocatory plunger for applying adhesive to an envelope blank, a pair of spaced members for supporting the envelope blank with the adhesive receiving portion therebetween, means for clamping the blank to one of said members, means for moving the plunger to and beyond the plane of the upper surface of said spaced members to engage and depress the adhesive receiving portion of the envelope blank during the application of the adhesive.

7. In a machine for forming an envelope from a blank having a body portion and side wings, in combination, means for feeding the blank to folding position, registering means movable into engagement with parts of the blank to register the same in folding position, means for holding the blank stationary in registered position, and means for folding the blank while so held.

8. In a machine for forming an envelope from a blank having a body portion and side wings, means for folding the wings into overlapping relation with each other on the body portion, means for retarding the arrival of one of the wings into its ultimate position, registering means for adjusting the position of the blank with respect to the folding means prior to the folding operation, and means for holding the blank in position during such folding operation.

9. In a machine for forming an envelope from a blank having a body portion and side wings, a bed and parallel presser strips extending along said bed, means for folding the wings into overlapping relation on the body portion, means for feeding an envelope blank forward between said presser strips and bed to folding position, registering means for adjusting the position of the blank between the bed and presser strips with respect to the folding means, and means for releasing the pressure of said presser strips during the operation of said registering means.

10. In a machine for forming an envelope from a blank having a body portion and side wings, means for folding the wings into overlapping relation with each other on the body portion, means for retarding the arrival of one of the wings into its ultimate position, means for feeding the blank to folding position, means for positioning the blank with respect to the folding means prior to the folding operation, means for holding the blank in position during such folding operation, and means for forcing the overlying wing into contact with the underlying wing subsequent to the folding operation.

11. In a machine of the class described, reciprocating grippers arranged to engage the forward end of a winged enveloped blank for moving it in a given path, means movable angularly with respect to the path of travel of the blank to fold the wings on to the body portion of the blank, means movable into and out of the path of travel of the blank to engage one end thereof, and means engageable with the other end of the blank and cooperating with the last-mentioned means to position the blank with respect to the folding means.

12. In a machine of the class described, means for folding the wings of an envelope blank on to the body portion thereof, movable abutments, means for moving the abutments into and out of the path of travel of the blank, and means movable into engagement with the opposite end of the blank to cooperate with the abutments to align the blank prior to the folding operation.

13. In a machine of the class described, means for folding the wings of an envelope blank on to the body portion thereof, movable abutments, means for moving the abutments into and out of the path of travel of the blank, means engageable with the opposite end of the blank to cooperate with the abutments to align the blank in position prior to the positioning operation, and means for momentarily releasing the blank during the positioning operation.

14. In a machine of the class described, means for supporting an envelope blank, means for clamping the body portion of said blank to the supporting means, means for supporting the wings of the blank in elevated positions, and means for engaging the wings and folding them into overlapping relation with each other.

15. In a machine of the class described, means for supporting an envelope blank, means for clamping the body portion of said blank to the supporting means, means for elevating and supporting the wings of the blank in elevated positions, and means for engaging the wings and folding them into overlapping relation with each other.

16. In a machine of the class described, means for supporting an envelope blank, means for clamping the body portion of said blank to the supporting means, means for supporting the wings of the blank in elevated positions, means for engaging the wings and folding them into overlapping relation with each other, and means for releasing the clamping means.

17. In a machine of the class described, means for supporting an envelope blank, means for clamping the body portion of said blank to the supporting means, means for supporting the wings of the blank in elevated positions, and means for engaging the wings and folding them against the edges of the clamping means into overlapping relation with each other.

18. In a machine of the class described, means for supporting an envelope blank, a clamp to hold the body of the blank to the supporting means, a pair of spaced guides elevated above the support to elevate and maintain the wings of the blank in such positions, and a pair of reciprocatory folding plates engageable with the wings to fold the same into overlapping relation with each other.

19. In a machine of the class described, means for supporting an envelope blank, a clamp to hold the body of the blank to the supporting means, a pair of spaced guides elevated above the support to maintain the wings of the blank in such positions, and a pair of reciprocatory folding plates engageable with the wings to fold the same into overlapping relation with each other.

20. In a machine of the class described, means for supporting an envelope blank, a clamp to hold the body of the blank to the supporting means, a pair of spaced guides elevated above the support to elevate and maintain the wings of the blank in such positions, and a pair of plates arranged to reciprocate beneath the guides to fold the wings into overlapping relation with each other.

21. In a machine of the class described, means for supporting an envelope blank, a clamp for holding the body of the blank to the supporting means, means for folding the wings of the blank over the body portion into overlapping relation with each other, a rod located between the edges and extending longitudinally of the clamp, and means for moving the folding means to points short of the rod.

22. In a machine of the class described, means for applying an adhesive to one side wing of an envelope blank, means for applying an adhesive to one end wing of said blank, means for conveying the blank from one adhesive applying means to the other, said last mentioned adhesive applying means comprising a pair of rotating members having cooperating protrusions and depressions, means for applying adhesive to the protrusions, and means for preventing the entrance of the protrusions into the depressions when an envelope blank is located between the plates.

23. In a machine of the class described, a pair of plates arranged to cooperate to apply adhesive to an envelope blank, one of said plates having depressions therein, and the other of said plates having spring pressed protrusions adapted to seat in said depressions, means for moving said plates to bring the protrusions and depressions into registering relation, and means for retracting the protrusions at such time.

24. In a machine of the class described, a pair of plates arranged to cooperate to apply adhesive to an envelope blank, one of said plates having depressions therein, and the other of said plates having protrusions adapted to seat in said depressions, means for moving said plates to bring the protrusions and depressions into registering relation, and means for retracting the protrusions at such time.

25. In a machine of the class described, a pair of cooperating plates to apply adhesive to an envelope blank, one of said plates having depressions therein, and the other of said plates having protrusions on a slide within said plate, means for normally urging said slide and protrusions to their outermost positions, and a cam for retracting the slide and protrusions carried thereby within their carrying plate.

26. In a machine of the class described, means for supporting a stack of envelope blanks, means for applying an adhesive to one wing of each of said blanks, means for folding the wings of the blanks, and means comprising grippers engaging the forward end of the blank for simultaneously withdrawing a blank from the stack and a blank from the adhesive applying mechanism.

27. In a machine of the class described, means for supporting a stack of envelope blanks, means for applying adhesive to one wing of a blank; means for folding the wings of a blank; and means for feeding blanks comprising a reciprocatory slide having grippers arranged to engage the forward edge of a blank and to carry it to adhesive applying position, and grippers arranged to engage the forward edge of another blank and to carry it forward from adhesive applying position to wing folding position.

28. In a machine of the class described, means for feeding envelope blanks, means for folding said blanks, means for clamping said blanks in folding position, means for registering the blanks in folding position prior to the operation of the folding means, and means for releasing the pressure of the clamping means during the operation of the registering devices.

29. In a machine of the class described, a support for a stack of blanks, a machine bed, means for withdrawing envelope blanks from said stack support and feeding the same along the bed to adhesive applying position and from adhesive applying position to wing folding position, means for folding the wings, parallel pressure plates extending along and above said bed from adjacent the stack support to and beyond the folding position, and means for exerting pressure upon said pressure plates at the folding position during the operation of the folding devices.

30. In a machine of the class described, means for supporting a stack of envelope blanks, means for applying an adhesive to one wing of each of said blanks, means for folding the wings of the blanks, means for simultaneously moving a blank from the stack to the adhesive applying means and a previously withdrawn blank from the adhesive applying means to the folding means, said withdrawing means including a reciprocatory slide, a pair of grippers mounted thereon, common means for closing said grippers at a predetermined point in the movement of the slide, and means for opening the grippers.

31. In a machine of the class described, means for supporting a stack of envelope blanks, means for applying an adhesive to one wing of each of said blanks, means for folding the wings of the blanks, means for simultaneously moving a blank from the stack to the adhesive applying means and a previously withdrawn blank from the adhesive applying means to the folding means, said withdrawing means including a reciprocatory slide, a pair of grippers mounted thereon, common resilient means for closing said grippers at a predetermined point in the movement of the slide, and means for opening the grippers.

32. In a machine of the class described, means for supporting a stack of envelope blanks, means for applying an adhesive to one wing of each of said blanks, means for folding the wings of the blanks, means for simultaneously moving a blank from the stack to the adhesive applying means and a previously withdrawn blank from the adhesive applying means to the folding means, said withdrawing means including a reciprocatory slide, a pair of grippers mounted thereon, common means for simultaneously closing said grippers at a predetermined point in the movement of the slide, and means for opening the grippers.

33. In a machine of the class described, means for supporting a stack of envelope blanks, means for applying an adhesive to one wing of each of said blanks, means for folding the wings of the blanks, means for simultaneously moving a blank from the stack to the adhesive applying means and a previously withdrawn blank from the adhesive applying means to the folding means, said withdrawing means including a reciprocatory slide, a pair of grippers mounted thereon, common means for simultaneously closing said grippers at a predetermined point in the movement of the slide, and means for simultaneously opening the grippers.

34. In a machine of the class described, the combination with mechanism for forming envelopes from blanks and mechanism for assembling said formed envelopes, of a pair of rolls disposed between said mechanism and adapted to receive envelopes from the forming mechanism, means permitting said rolls to engage the envelopes in their passage between the same, means for preventing the engagement of the rolls with each other when no envelope is fed between the rolls, and means for conveying the envelopes from said cooperating rolls to the assembling mechanism.

35. In a machine of the class described, the combination with envelope forming and assembling mechanisms, of a pair of rolls located therebetween and adapted to receive envelopes from the forming mechanism, one of said rolls being adapted to move to and away from the other, means for normally urging said movable roll toward the other roll, and means for preventing the movable roll from exerting pressure on the other roll except when an envelope is located therebetween, said means including a magnetically controlled cam.

36. In a machine of the class described, the combination with envelope forming and assembling mechanisms, of a pair of rolls located therebetween and adapted to receive envelopes from the forming mechanism, one of said rolls being adapted to move to and away from the other, means for normally urging said movable roll toward the other roll, means for preventing the movable roll from exerting pressure on the other roll except when an envelope is located therebetween, said means including a cam movable with the roll, a lever cooperating with the cam to control the extent of movement of the roll, and a magnetically controlled abutment to permit the lever to move to various extents.

37. In a machine of the class described, the combination with envelope forming and assembling mechanisms, of a pair of rolls located therebetween and adapted to receive envelopes from the forming mechanism, one of said rolls being adapted to move to and away from the other, means for normally urging said movable roll toward the other roll, means for preventing the movable roll from exerting pressure on the other roll except when an envelope is located therebetween, said means including a cam movable with the roll, a lever cooperating with the cam to control the extent of movement of the roll, and a magnetically controlled abutment to control the movements of the lever, and means for moving the abutment into the path of travel of the lever.

38. In a machine of the class described, the combination with envelope forming and assembling mechanisms, of a pair of rolls located therebetween and adapted to receive envelopes from the forming mechanism, one of said rolls being adapted to move to and away from the other, means for normally urging said movable roll toward the other roll, means for preventing the movable roll from exerting pressure on the other roll except when an envelope is located therebetween, said means including a cam movable with the roll, a lever cooperating with the cam to control the extent of movement of the roll, a magnetically controlled abutment to permit the lever to move to various extents, means for moving the abutment into the path of travel of the lever to various extents, and means for controlling the extent of movement of said abutment.

39. In a machine of the class described, the combination with envelope forming and receiving mechanisms, of mechanism located between said aforementioned mechanisms for conveying the envelopes from the former to the latter, said mechanisms including a series of rolls, and pneumatic means for forcing and conveying envelopes horizontally from the rolls to the receiving mechanisms.

40. In a machine of the character described, the combination with means for supporting a stack of envelope blanks, of a machine bed and parallel clamping strips extending along the same, means for folding the side wings of the successive blanks, means for exerting pressure on the strips for clamping the successive envelope blanks during the folding operation, means for successively withdrawing blanks from the bottom of said stack and drawing them along between the bed and clamping strips to folding position including grippers arranged to engage the forward edge of a blank, means engaging the edges of the blank for positioning successive blanks in folding position, and means for momentarily releasing the pressure of the clamping strips during the positioning of the blank.

41. In a machine of the class described, in combination, a bed and parallel clamping strips extending along the same, reciprocatory grippers arranged to engage the forward edge of an envelope blank and draw the same along the machine bed and beneath said clamping strips, means for folding the side wings of the blank, means movable into engagement with the edges of the blank for positioning the same in folding position, and means for momentarily releasing the pressure of the clamping strips upon the blank during the operation of the positioning means.

42. In a machine of the class described, the combination with means for applying an adhesive to one side wing of each of a series of envelope blanks, of means for positioning each blank, means for folding the side wings of each blank, means for applying an adhesive to one end wing of each blank, means for folding said end wing, means for printing on one side of each formed envelope, means for assembling the formed and printed envelopes, means for exerting pressure on the envelope blanks in their travel from the adhesive applying mechanism to the means for folding the end wing, and means for momentarily releasing said pressure during the positioning of each blank.

43. In a machine of the class described, the combination with means for positioning envelope blanks, of means for folding the side wings of the positioned blanks, means for applying an adhesive to one end wing of each blank, means for folding said end wing, means for printing on one side of each formed envelope, means for assembling the formed and printed envelopes, means for exerting pressure on the envelope blanks in their travel from the adhesive applying mechanism to the means for folding the end wing, and means for momentarily releasing said pressure during the positioning of each blank.

44. In a machine of the class described, the combination with means for positioning envelope blanks of means for applying adhesive to each blank, means for folding the blank to form an envelope, means for printing on one side of each formed envelope, and means for assembling the formed and printed envelopes.

45. In a machine of the class described, means for folding the side wings of an envelope blank, means for feeding the blank to the folding means, means for positioning the blank subsequent to the feeding operation and prior to the folding operation, and means for clamping the blank in position during the folding operation.

46. In a machine of the class described, adjustable means for supporting a stack of envelope blanks, of various sizes, means for folding the side wings of said blanks, means for feeding the blanks successively to the folding means, means for guiding the blanks during the feeding operation, and means for flattening the side wings of the blanks prior to their delivery to the wing-folding means.

47. In a machine of the class described, means for folding the side wings of an envelope blank, said means including a pair of reciprocatory plates, wipers pivoted to said plates, and means for actuating the reciprocatory plates and the wipers.

48. In a machine of the class described, means for folding the side wings of an envelope blank, said means including a pair of reciprocatory plates, wipers pivoted to said plates, and means for actuating the wipers during the reciprocation of the plates.

49. In a machine of the class described, means for folding the side wings of an envelope blank, said means including means for initially folding the wings of large blanks, and means for completing the folding of said wings.

50. In a machine of the class described, means for folding the side wings of an envelope blank, said means including means for initially folding the wings of a large blank, and means carried and controlled by the initial folding means to complete the folding of said wings.

51. In a machine of the class described, means for folding the side wings of an envelope blank, said means including means for initially folding the wings of a large blank, and means controlled by the initial folding means to complete the folding of said wings.

52. In a machine of the class described, means for folding the side wings of an envelope blank, means for feeding the envelope blank to the folding means, means for registering the blank with respect to the folding means, including abutments movable into engagement with the forward and rear edges of the blank and to registering position to position the blank, and means for clamping the blank in registered position during the folding operation.

53. In a machine of the character described, in combination, folding means, means for feeding an envelope blank having side wings and end flaps to folding position, and means for registering the blank in folding position comprising registering fingers movable laterally of the blank into engagement with the corners between one end flap and the side wings and other registering fingers movable longitudinally of the blank into engagement with the corners between the other end flap and the side wings.

54. In a machine of the class described, means for supporting an envelope blank, adjustable means for holding said blank to said support, and adjustable adhesive applying plunger, a reciprocatory roll for supplying adhesive to said plunger, and means for varying the extent of reciprocation of said roll.

55. In a machine of the class described, upper and lower guides and means for feeding an envelope blank therebetween, parallel spaced members at one side of said guides arranged to support one wing of the envelope blank, and an adhesive applying member arranged to engage the upper face of the wing between the spaced members, substantially as described.

56. In a machine of the class described, the combination with envelopes forming and assembling mechanisms, of a pair of rolls located therebetween and adapted to receive envelopes from the forming mechanism, one of said rolls being adapted to move to and away from the other, and a gripper carried by one of said rolls engageable over the edge of an envelope, means for controlling the movement of the movable roll comprising an electric circuit which is closed by the closing of the gripper in the absence of an envelope therein and is broken by the presence of an envelope in said gripper.

In testimony whereof, I have signed my name to this specification this 21st day of September, 1921.

EUGENE CONTI.